(12) United States Patent
Falde et al.

(10) Patent No.: US 12,042,887 B2
(45) Date of Patent: Jul. 23, 2024

(54) WELD MONITORING SYSTEMS WITH UNKNOWN DOWNTIME DISABLING

(71) Applicant: ILLINOIS TOOL WORKS INC., Glenview, IL (US)

(72) Inventors: Leland D. Falde, Jackson, MI (US); Stephen P. Ivkovich, East Lansing, MI (US); Vincent N. Romano, Pinckney, MI (US); Craig Jeffords, Waukesha, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 530 days.

(21) Appl. No.: 16/872,891

(22) Filed: May 12, 2020

(65) Prior Publication Data

US 2020/0368839 A1    Nov. 26, 2020

Related U.S. Application Data

(60) Provisional application No. 62/851,219, filed on May 22, 2019.

(51) Int. Cl.
*B23K 9/095* (2006.01)
*B23K 31/12* (2006.01)
*G05B 19/418* (2006.01)

(52) U.S. Cl.
CPC .......... *B23K 9/0953* (2013.01); *B23K 9/0956* (2013.01); *B23K 31/125* (2013.01);
(Continued)

(58) Field of Classification Search
CPC .. B23K 9/0953; B23K 9/0956; B23K 31/125; B23K 9/1075; B23K 9/1087;
(Continued)

(56) References Cited

U.S. PATENT DOCUMENTS

| 4,375,026 A | 2/1983 | Kearney |
| 5,714,734 A | 2/1998 | Peterson et al. |

(Continued)

FOREIGN PATENT DOCUMENTS

| CA | 2356304 | 2/2001 |
| CN | 101193723 | 6/2008 |

(Continued)

OTHER PUBLICATIONS

European Patent Office, Extended Search Report, European Patent Application No. 20161414.6, dated Aug. 5, 2020, 7 pages.

(Continued)

*Primary Examiner* — Charles R Kasenge
(74) *Attorney, Agent, or Firm* — McAndrews, Held & Malloy, Ltd.

(57) ABSTRACT

Systems and methods for weld monitoring systems with unknown downtime disabling are described. In some examples, a local monitoring station may perform activity tracking as part of a larger weld monitoring system. A welding device may send welding data to the local monitoring system, which may be used to determine a current activity. A user may also manually input an activity to use as the current activity. If the local monitoring station is unable to determine a current activity from the welding data or user input, then the local monitoring station determines that an unknown downtime has occurred. If the local monitoring station cannot determine a reason for the unknown downtime, the welding device may be disabled until the user provides a reason for the unknown downtime.

20 Claims, 13 Drawing Sheets

(52) U.S. Cl.
CPC ............... *G05B 19/41875* (2013.01); *G05B 2219/32368* (2013.01); *G05B 2219/45135* (2013.01)

(58) Field of Classification Search
CPC .... G05B 19/41875; G05B 2219/32368; G05B 2219/45135
See application file for complete search history.

(56) References Cited

U.S. PATENT DOCUMENTS

| | | | |
|---|---|---|---|
| 5,756,967 | A | 5/1998 | Quinn et al. |
| 6,484,584 | B2 | 11/2002 | Johnson et al. |
| 6,583,386 | B1 | 6/2003 | Ivkovich |
| 6,624,388 | B1 | 9/2003 | Blankenship et al. |
| 6,795,778 | B2 | 9/2004 | Dodge et al. |
| 6,815,640 | B1 | 11/2004 | Spear et al. |
| 7,159,753 | B2 | 1/2007 | Subrahmanyam |
| 7,375,304 | B2 | 5/2008 | Kainec et al. |
| 7,574,172 | B2 | 8/2009 | Clark et al. |
| 7,643,890 | B1 | 1/2010 | Hillen et al. |
| 7,687,741 | B2 | 3/2010 | Kainec et al. |
| 7,772,524 | B2 | 8/2010 | Hillen et al. |
| 7,873,495 | B2 | 1/2011 | Lindell |
| 8,224,881 | B1 | 7/2012 | Spear et al. |
| 8,274,013 | B2 | 9/2012 | Wallace |
| 8,355,805 | B2 | 1/2013 | Ricket |
| 8,592,723 | B2 | 11/2013 | Davidson et al. |
| 8,847,115 | B2 | 9/2014 | Casner et al. |
| 9,193,004 | B2 | 11/2015 | Enyedy et al. |
| 9,266,182 | B2 | 2/2016 | Hung |
| 9,321,133 | B2 | 4/2016 | Fischer et al. |
| 9,415,514 | B2 | 8/2016 | Geheb et al. |
| 9,449,498 | B2 | 9/2016 | Dina et al. |
| 9,481,045 | B2 | 11/2016 | Spear |
| 9,498,839 | B2 | 11/2016 | Hillen et al. |
| 9,514,421 | B2 | 12/2016 | Mullin |
| 9,665,093 | B2 | 5/2017 | Lamers et al. |
| 9,669,484 | B2 | 6/2017 | Holverson et al. |
| 9,684,303 | B2 | 6/2017 | Lamers et al. |
| 9,704,140 | B2 | 7/2017 | Lamers et al. |
| 9,724,787 | B2 | 8/2017 | Becker et al. |
| 9,773,429 | B2 | 9/2017 | Boulware |
| 9,821,400 | B2 | 11/2017 | Hillen et al. |
| 9,836,994 | B2 | 12/2017 | Kindig et al. |
| 9,862,048 | B2 | 1/2018 | Holverson et al. |
| 9,862,049 | B2 | 1/2018 | Becker |
| 9,889,517 | B2 | 2/2018 | Lambert et al. |
| 9,937,577 | B2 | 4/2018 | Daniel |
| 9,937,578 | B2 | 4/2018 | Becker et al. |
| 9,965,973 | B2 | 5/2018 | Peters et al. |
| 9,975,196 | B2 | 5/2018 | Zhang et al. |
| 9,993,890 | B2 | 6/2018 | Denis et al. |
| 10,010,959 | B2 | 7/2018 | Daniel |
| 10,012,962 | B2 | 7/2018 | Lamers et al. |
| 10,032,388 | B2 | 7/2018 | Sommers et al. |
| 10,065,260 | B2 | 9/2018 | Hutchison |
| 10,099,308 | B2 | 10/2018 | Vogel |
| 10,144,080 | B2 | 12/2018 | Chantry et al. |
| 10,183,351 | B2 | 1/2019 | Peters |
| 10,204,406 | B2 | 2/2019 | Becker et al. |
| 10,213,862 | B2 | 2/2019 | Holverson et al. |
| 10,242,317 | B2 | 3/2019 | Barhorst et al. |
| 10,688,584 | B2 | 6/2020 | Starzengruber |
| 10,722,969 | B2 | 7/2020 | Ulrich |
| 11,103,948 | B2 | 8/2021 | Holverson |
| 11,347,191 | B2 | 5/2022 | Hsu |
| 2006/0169682 | A1 | 8/2006 | Kainec et al. |
| 2006/0285330 | A1* | 12/2006 | Sundell ............ A61F 9/067 362/293 |
| 2009/0173726 | A1 | 7/2009 | Davidson et al. |
| 2012/0248081 | A1 | 10/2012 | Hutchison |
| 2013/0105556 | A1 | 5/2013 | Abell |
| 2014/0131320 | A1 | 5/2014 | Hearn et al. |
| 2014/0332514 | A1 | 11/2014 | Holverson et al. |
| 2015/0069112 | A1 | 3/2015 | Abou-Nasr et al. |
| 2015/0183043 | A1* | 7/2015 | Starzengruber ........... H02J 5/00 219/130.1 |
| 2017/0032281 | A1 | 2/2017 | Hsu |
| 2017/0036288 | A1 | 2/2017 | Albrecht |
| 2017/0072496 | A1 | 3/2017 | Falde et al. |
| 2017/0185058 | A1 | 6/2017 | Holverson et al. |
| 2018/0032066 | A1 | 2/2018 | Enyedy et al. |
| 2018/0178320 | A1 | 6/2018 | Webster |
| 2019/0022787 | A1 | 1/2019 | Daniel |
| 2019/0084069 | A1 | 3/2019 | Daniel et al. |
| 2019/0160601 | A1 | 5/2019 | Daniel |
| 2019/0163172 | A1 | 5/2019 | Daniel et al. |

FOREIGN PATENT DOCUMENTS

| | | |
|---|---|---|
| CN | 101374627 | 2/2009 |
| CN | 102528227 | 7/2012 |
| CN | 102596476 | 7/2012 |
| CN | 102922089 A | 2/2013 |
| CN | 103331506 | 10/2013 |
| CN | 103846915 | 6/2014 |
| CN | 103862135 | 6/2014 |
| CN | 103874965 | 6/2014 |
| CN | 103909325 | 7/2014 |
| CN | 104379291 | 2/2015 |
| CN | 104520046 | 4/2015 |
| CN | 104551372 | 4/2015 |
| CN | 104768694 | 7/2015 |
| CN | 106104587 | 11/2016 |
| CN | 107155317 | 9/2017 |
| CN | 107635710 | 1/2018 |
| CN | 107848083 | 3/2018 |
| CN | 108027911 | 5/2018 |
| DE | 102009016798 A1 | 10/2010 |
| WO | 0109723 | 2/2001 |
| WO | 2013160745 | 10/2013 |
| WO | 2014149786 A1 | 9/2014 |
| WO | 2018080994 | 5/2018 |

OTHER PUBLICATIONS

European Patent Office, Extended Search Report, European Patent Application No. 20176044.4, dated Dec. 17, 2020, 9 pages.

PCT, Notification of Transmittal of the International Search Report and the Written Opinion of the International Searching Authority, or the Declaration, in Application No. PCT/US2016/051585, dated Dec. 21, 2016 (12 pages).

PCT, Notification of Transmittal of the International Search Report and the Written Opinion of the International Searching Authority, or the Declaration, in International application No. PCT/US2016/051579, dated Jan. 10, 2017 (12 pages).

Canadian Office Action Appln No. 2,996,182 dated Nov. 5, 2019 (5 pgs.).

Ting Wang, Binliang Jiao, Limeng Ji, "A Wireless Sensor Network Design in Oilfield based on STM32W108", Computer Security, No. 05, May 15, 2011.

Le Zhang, Guangzhi Li, Xin Zeng, "Analysis of Factors Affecting Human Reliability", China Military-Civilian Conversion, No. 03, Mar. 10, 2016.

Shuang Zheng, Mingri Zhu, Yue Wang, "Design of Welding Controlled System Power Source Based on Intensive Interference", Electric Welding Machine, No. 12, Dec. 20, 2008.

\* cited by examiner

WELD MONITORING SYSTEMS WITH UNKNOWN DOWNTIME DISABLING

CROSS-REFERENCE TO RELATED APPLICATION

The present application claims the benefit of U.S. provisional patent application 62/851,219, filed May 22, 2019, entitled "WELD MONITORING SYSTEMS WITH UNKNOWN DOWNTIME DISABLING," the contents of which are hereby incorporated by reference in their entirety.

TECHNICAL FIELD

The present disclosure generally relates to weld monitoring systems and, more particularly, to weld monitoring systems with unknown downtime disabling.

BACKGROUND

Weld monitoring systems monitor data pertaining to welding operations. In order to monitor the welding operations, the weld monitoring systems rely upon welding operators to provide input about the welding operations. Lack of operator input can result in ineffective monitoring.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to weld monitoring systems with unknown downtime disabling, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

Figure 1:
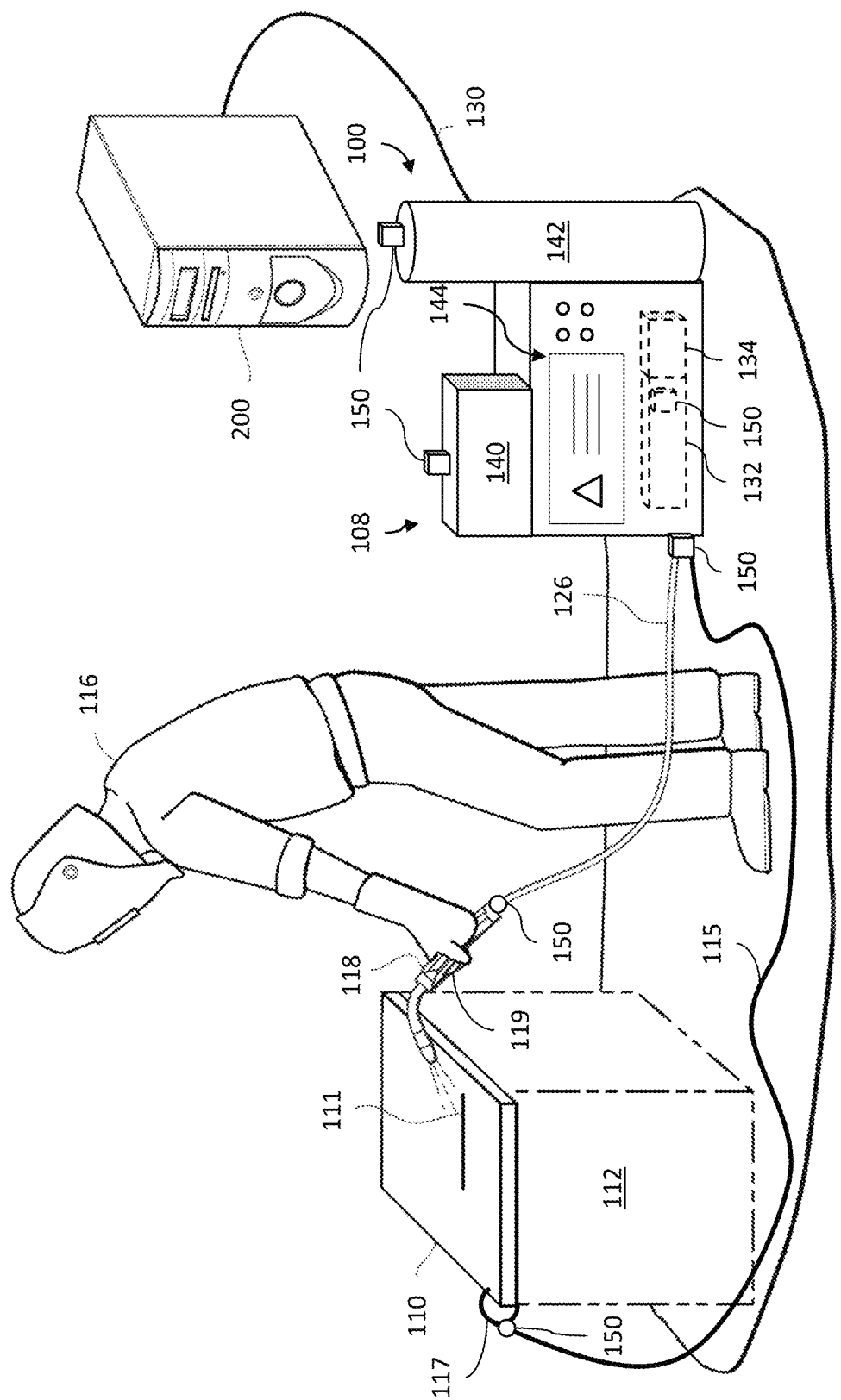
FIG. 1 shows a welding system in communication with a local monitoring station, in accordance with aspects of this disclosure.

The figures are not necessarily to scale. Where appropriate, the same or similar reference numerals are used in the figures to refer to similar or identical elements. For example, reference numerals utilizing lettering (e.g., job 420a, job 420b) refer to instances of the same reference numeral that does not have the lettering (e.g., jobs 420).

DETAILED DESCRIPTION

Some examples of the present disclosure relate to a distributed weld monitoring system with job tracking. Conventional weld monitoring systems require operators to provide monitoring input in order to work effectively. Conventionally, the monitoring input would be entered at a local monitoring station. However, the local monitoring stations are designed to be stationary and may be difficult to transport. Additionally, some work environments are relatively large. In such environments, welding equipment may be located at a significant distance from the local monitoring station, necessitating either moving the local monitoring station, or a long commute between the welding equipment and the local monitoring station.

The present disclosure contemplates a distributed weld monitoring system that allows welding operators to provide monitoring input via a lightweight, handheld user device, such as a mobile device (e.g., a smartphone, tablet, laptop, personal digital assistant, etc.), for example. The user device may in turn communicate the monitoring input to a central monitoring station. Such a distributed monitoring system removes the necessity of long commutes or heavy lifting, allowing an operator to use a convenient lightweight device to enter monitoring input instead.

In some examples, the distributed weld monitoring system organizes monitoring data around a particular job and/or job session. For example, the job may be the construction of a vehicle chassis for a large earth mover. In such an example, each job session might correspond to a period of time that an operator works on the vehicle chassis. As another example, the job might be the construction of the entire earth mover, and each job session might correspond to a period of time than an operator works on any aspect of the earth mover. In some examples, each job is associated with multiple job sessions. In some examples, each job session is associated with a single job, a single welding device, and/or a single operator. By organizing the monitoring data according to jobs and job sessions when collecting the monitoring data, it becomes possible to view and/or analyze the monitoring data according to each job and/or job session after the job is over. For example, the distributed weld monitoring system may be able to determine how much time, material, and/or other resources were spent to complete the job (and/or one or more particular job sessions), which may be used for billing, accounting, quality assurance, performance review, future planning, etc.

In some examples, the job and job session data collection may also allow for monitoring data analysis while the job is still ongoing. For example, the distributed weld monitoring system may estimate a completion percentage of the job while the job is ongoing. For example, the job may be estimated to require a certain amount of one or more job parameters (e.g., man hours, arc or welding time, number of welds, amount of deposition material, etc.). In such an example, the distributed weld monitoring system may be able to estimate a completion percentage based on a comparison of the estimated job requirement(s) and the recorded job data.

Because the distributed weld monitoring system works best when operators regularly provide monitoring input, in some examples, the distributed weld monitoring system may take steps to encourage operator input. In some examples, this encouragement may take the form of disabling one or more welding devices that the operator is using until operator input is forthcoming.

FIG. 1 shows an example welding system 100 and local monitoring station 200. As shown, the welding system 100 includes a welding torch 118 and work clamp 117 coupled to a welding-type power supply 108. As shown, the local monitoring station 200 is electrically coupled to (and/or in electrical communication with) the welding-type power supply 108. In some examples, the local monitoring station 200 may also be in communication with the welding torch 118 (e.g., via the welding-type power supply 108).

In the example of FIG. 1, an operator 116 is handling the welding torch 118 near a welding bench 112. In some examples, the welding bench 112 may be and/or include a fixturing system configured to hold one or more workpiece(s) 110. In some examples the fixturing system may include one or more work clamps 117 (e.g., manual and/or pneumatic clamps). In some examples, the workpiece(s) 110 may be independent of a welding bench 112, such as, for example a freestanding element such as a structural steel element, pipeline, or bridge. While a human operator 116 is shown in FIG. 1, in some examples, the operator 116 may be a robot and/or automated welding machine.

In the example of FIG. 1, the welding torch 118 is coupled to the welding-type power supply 108 via a welding cable 126. A clamp 117 is also coupled to the welding-type power supply 108 via a clamp cable 115. The welding-type power supply 108 is, in turn, in communication with local monitoring station 200, such as via conduit 130. In some examples, the welding-type power supply 108 may alternatively, or additionally, include wireless communication capabilities (e.g., wireless communication circuitry), through which wireless communication may be established with local monitoring station 200.

In the example of FIG. 1, the welding torch 118 is a gun configured for gas metal arc welding (GMAW). In some examples, the welding torch 118 may comprise an electrode holder (i.e., stinger) configured for shielded metal arc welding (SMAW). In some examples, the welding torch 118 may comprise a torch and/or filler rod configured for gas tungsten arc welding (GTAW). In some examples, the welding torch 118 may comprise a gun configured for flux-cored arc welding (FCAW). In some examples, the welding torch 118 may additionally, or alternatively, comprise a filler rod. In the example of FIG. 1, the welding torch 118 includes a trigger 119. In some examples, the trigger 119 may be activated by the operator 116 to trigger a welding-type operation (e.g., arc).

In the example of FIG. 1, the welding-type power supply 108 includes (and/or is coupled to) a wire feeder 140. In some examples, the wire feeder 140 houses a wire spool that is used to provide the welding torch 118 with a wire electrode (e.g., solid wire, cored wire, coated wire). In some examples, the wire feeder 140 further includes motorized rollers configured to feed the wire electrode to the torch 118 (e.g., from the spool) and/or retract the wire electrode from the torch 118 (e.g., back to the spool).

In the example of FIG. 1, the welding-type power supply 108 also includes (and/or is coupled to) a gas supply 142. In some examples, the gas supply 142 supplies a shielding gas and/or shielding gas mixtures to the welding torch 118 (e.g., via cable 126). A shielding gas, as used herein, may refer to any gas (e.g., $CO_2$, argon) or mixture of gases that may be provided to the arc and/or weld pool in order to provide a particular local atmosphere (e.g., shield the arc, improve arc stability, limit the formation of metal oxides, improve wetting of the metal surfaces, alter the chemistry of the weld deposit, and so forth).

Figure 2:
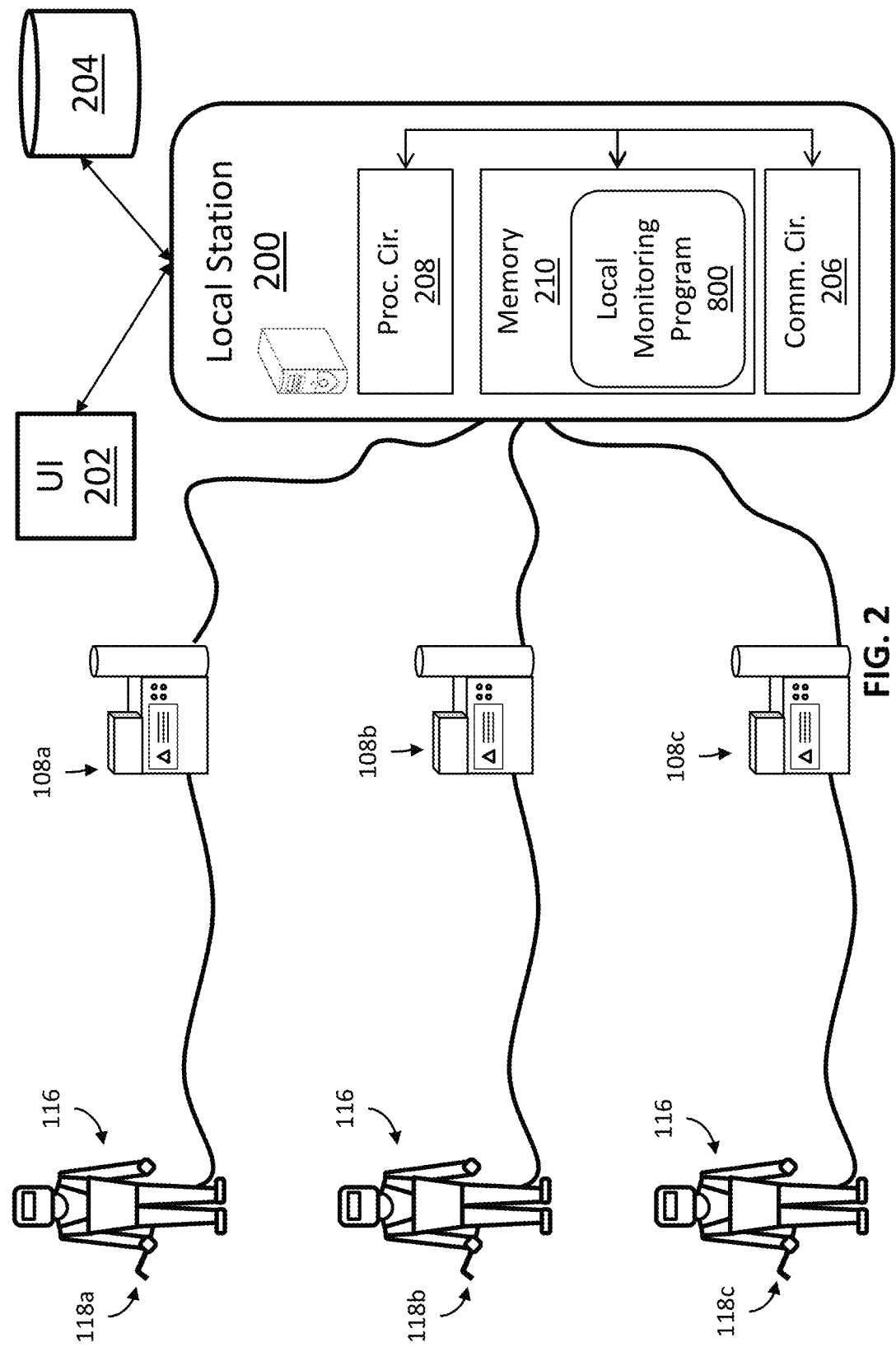
FIG. 2 shows the local monitoring station of FIG. 1 in communication with several welding systems, in accordance with aspects of this disclosure.

In the example of FIGS. 1 and 2, the welding-type power supply 108 also includes an operator interface 144. In the example of FIG. 1, the operator interface 144 comprises one or more adjustable inputs (e.g., knobs, buttons, switches, keys, etc.) and/or outputs (e.g., display screens, lights, speakers, etc.) on the welding-type power supply 108. In some examples, the operator interface 144 may comprise a remote control and/or pendant. In some examples, the operator 116 may use the operator interface 144 to enter and/or select one or more weld parameters (e.g., voltage, current, gas type, wire feed speed, workpiece material type, filler type, etc.) and/or weld operations for the welding-type power supply 108. In some examples, the operator interface 144 may further include one or more receptacles configured for connection to (and/or reception of) one or more external memory devices (e.g., floppy disks, compact discs, digital video disc, flash drive, etc.).

In the example of FIG. 1, the welding-type power supply 108 includes power conversion circuitry 132 configured to receive input power (e.g., from mains power, a generator, etc.) and convert the input power to welding-type output power. In some examples, the power conversion circuitry 132 may include circuit elements (e.g., transformers, rectifiers, capacitors, inductors, diodes, transistors, switches, and so forth) capable of converting the input power to output power. In some examples, the power conversion circuitry 132 may also include one or more controllable circuit elements. In some examples, the controllable circuit elements may comprise circuitry configured to change states (e.g., fire, turn on/off, close/open, etc.) based on one or more control signals. In some examples, the state(s) of the controllable circuit elements may impact the operation of the power conversion circuitry 132, and/or impact characteristics (e.g., current/voltage magnitude, frequency, waveform, etc.) of the output power provided by the power conversion circuitry 132. In some examples, the controllable circuit elements may comprise, for example, switches, relays, transistors, etc. In examples where the controllable circuit elements comprise transistors, the transistors may comprise any suitable transistors, such as, for example MOSFETs, JFETs, IGBTs, BJTs, etc.

As shown, the welding-type power supply 108 further includes control circuitry 134 electrically coupled to and configured to control the power conversion circuitry 132. In some examples, the control circuitry 134 may include processing circuitry (and/or one or more processors) as well as analog and/or digital memory. In some examples, the control circuitry 134 is configured to control the power conversion circuitry 132, so as to ensure the power conversion circuitry 132 generates the appropriate welding-type output power for carrying out the desired welding-type operation.

In some examples, the control circuitry 134 is also electrically coupled to and/or configured to control the wire feeder 140 and/or gas supply 142. In some examples, the control circuitry 134 may control the wire feeder 140 to output wire at a target speed and/or direction. For example, the control circuitry 134 may control the motor of the wire feeder 140 to feed the wire electrode to (and/or retract the wire electrode 250 from) the torch 118 at a target speed. In some examples, the welding-type power supply 108 may control the gas supply 142 to output a target type and/or amount gas. For example, the control circuitry 134 may control a valve in communication with the gas supply 142 to regulate the gas delivered to the welding torch 118.

In the example of FIG. 1, the welding system 100 further includes several sensors 150. In some examples, the sensors 150 may be configured to sense, detect, and/or measure various welding data of the welding system 100. For example, the sensors 150 may sense, detect, and/or measure a voltage and/or current of the power received by the welding-type power supply 108, power conversion circuitry 132, and/or welding torch, and/or the voltage and/or current of the power output by the welding-type power supply 108 and/or power conversion circuitry 132. As another example, the sensors 150 may sense, detect, and/or measure a velocity (e.g., speed and/or feed direction) of the wire feeder 140 and/or type of wire being fed by the wire feeder 140. As another example, the sensors 150 may sense, detect, and/or measure a gas type and/or gas flow (e.g., through a valve) from the gas supply 142 to the welding torch 118. As another example, the sensors 150 may sense, detect, and/or measure a trigger signal (e.g., pull, release, etc.) of the welding torch 118, and/or a clamping signal (e.g., clamp, unclamp, etc.) of the clamp 117. In some examples, the control circuitry 134 may be in communication with the sensors 150 and/or otherwise configured to receive information from the sensors 150.

In some examples, a welding operation (and/or welding process) may be initiated when the operator 116 activates the trigger 119 of the welding torch 118 (and/or otherwise activates the welding torch 118). During the welding operation, the welding-type power provided by the welding-type power supply 108 may be applied to the electrode (e.g., wire electrode) of the welding torch 118 in order to produce a welding arc between the electrode and the one or more workpieces 110. The heat of the arc may melt portions of a filler material (e.g., wire) and/or workpiece 110, thereby creating a molten weld pool. Movement of the welding torch 118 (e.g., by the operator) may move the weld pool, creating one or more welds 111.

When the welding operation is finished, the operator 116 may release the trigger 119 (and/or otherwise deactivate the welding torch 118). In some examples, the control circuitry 134 may detect that the welding operation has finished. For example, the control circuitry 134 may detect a trigger release signal via sensor 150. As another example, the control circuitry 134 may receive a torch deactivation command via the operator interface 144 (e.g., where the torch 118 is maneuvered by a robot and/or automated welding machine).

In some examples, the control circuitry 134 may detect (e.g., via sensors 150) certain welding data pertaining to the welding-type power supply 108, clamp 117, bench 112, and/or welding torch 118 during a welding process. In some examples, the control circuitry 134 is configured to communicate this welding data (e.g., via a data transfer object (dto)) to the local monitoring station 200. In some examples, the control circuitry 134 may be configured to communicate the welding data to the local monitoring station 200 in real time, periodically during a welding operation, and/or after a welding operation.

FIG. 2 shows the example local monitoring station 200 electrically (and/or communicatively) coupled to several example welding-type power supplies 108 and/or welding torches 118. As shown, the local monitoring station 200 is also electrically (and/or communicatively) coupled to a user interface (UI) 202 and a local data repository 204. In some examples, the local data repository 204 comprises a database. In some examples, the local data repository 204 is configured to store and/or organize welding data, monitoring input entered by an operator 116 (or other individual), and/or other relevant information.

In some examples, the user interface 202 may comprise a touch screen interface and/or one or more input devices (e.g., mouse, keyboard, buttons, knobs, microphones, etc.) and/or output devices (e.g., display screen, speakers, etc.). In some examples, the user interface 202 may further include one or more receptacles configured for connection to (and/or reception of) one or more external memory devices (e.g., floppy disks, compact discs, digital video disc, flash drive, etc.). In operation, an operator 116 or other user may provide input to, and/or receive output from, the local monitoring station 200 via the user interface 202. While shown as a separate component in the example of FIG. 2, in some examples, the UI 202 and/or local data repository 204 may be part of the local monitoring station 200.

FIG. 2 additionally shows example components of the local monitoring station 200. As shown, the local monitoring station 200 includes communication circuitry 206, processing circuitry 208, and memory 210, interconnected with one another via a common electrical bus. In some examples, the processing circuitry 208 may comprise one or more processors. In some examples, the communication circuitry 206 may include one or more wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the communication circuitry 206 may be configured to facilitate communication via one or more wired media and/or protocols (e.g., Ethernet cable(s), universal serial bus cable(s), etc.) and/or wireless mediums and/or protocols (e.g., near field communication (NFC), ultra high frequency radio waves (commonly known as Bluetooth), IEEE 802.11x, Zigbee, HART, LTE, Z-Wave, WirelessHD, WiGig, etc.). In some examples, the local monitoring station 200 may be implemented by way of a desktop computer or local server computer. In some examples, the memory 210 may store the local data repository 204. In the example of FIG. 2, the memory stores a local monitoring program 800, further discussed below.

Figure 3:
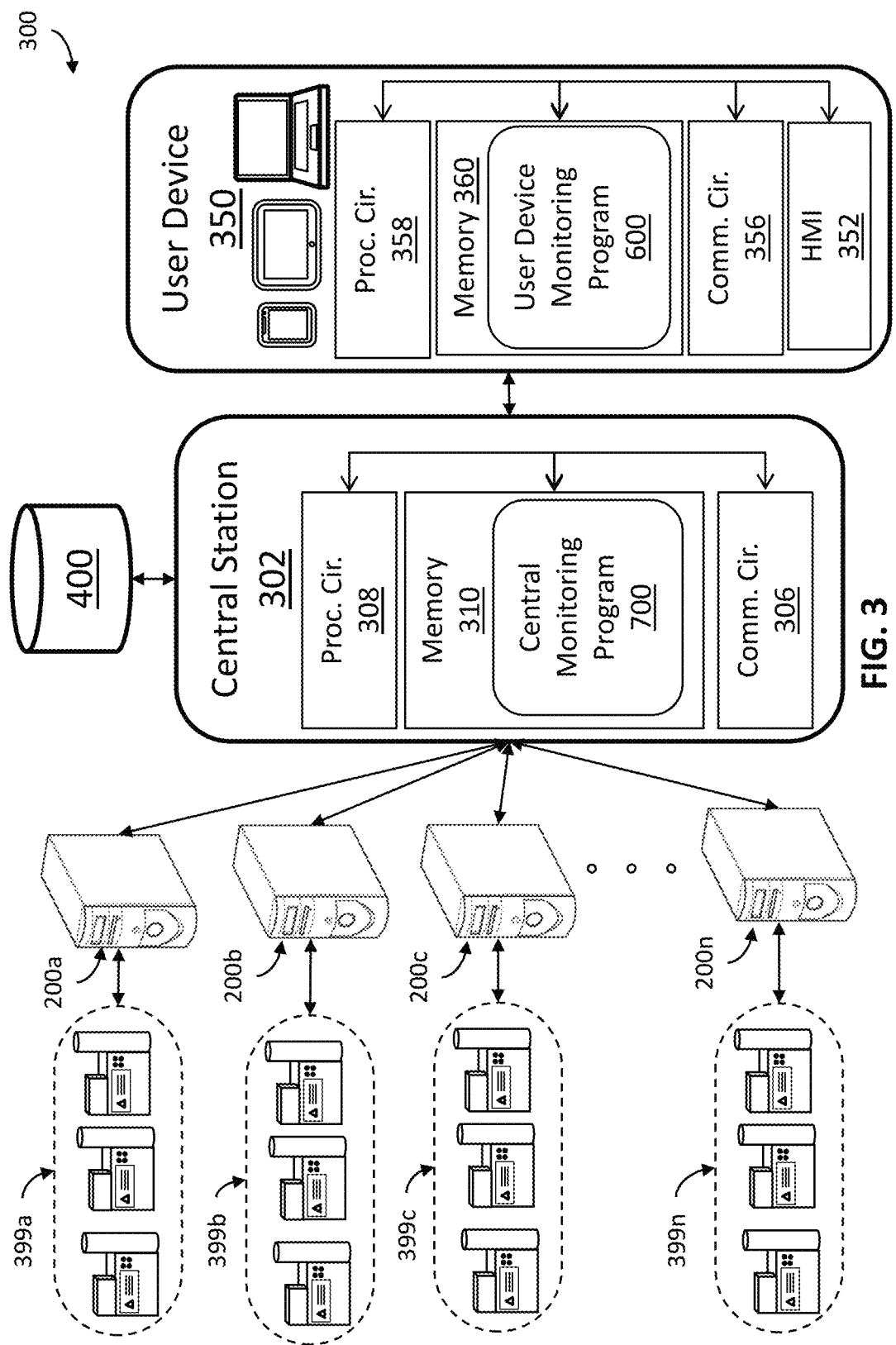
FIG. 3 shows an example distributed weld monitoring system, in accordance with aspects of this disclosure.

FIG. 3 shows an example of a distributed weld monitoring system 300. As shown, the distributed weld monitoring system 300 comprises a central monitoring station 302 electrically (and/or communicatively) coupled to several local monitoring stations 200, each of which is electrically (and/or communicatively) coupled to several welding devices 399. In some examples, each welding device 399 comprises a welding-type power supply 108, an output of a welding-type power supply 108 (e.g., for a multiple output welding-type power supply 108), a welding torch 118, a gas supply 142, a wire feeder 140, a clamp 117, and/or one or more other welding-type devices (e.g., a polishing device, sanding device, induction heating device, etc.). In the example of FIG. 3, the central monitoring station 302 is further electrically (and/or communicatively) coupled to central data repository 400.

In the example of FIG. 3, the central monitoring station 302 is additionally communicatively coupled to a user device 350. While only one user device 350 is depicted in the example of FIG. 3 for the sake of simplicity, in some examples a plurality of user devices may be in communication with the central monitoring station 302. In some examples, the user device 350 may be implemented by way of a mobile device (e.g., a smartphone, tablet, laptop, personal digital assistant, etc.).

In the example of FIG. 3, the user device 350 includes communication circuitry 356, processing circuitry 358, memory 360, and a human machine interface (HMI) 352 interconnected with one another via a common electrical bus. In some examples, the processing circuitry 358 may comprise one or more processors. In some examples, the communication circuitry 356 may include one or more wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the communication circuitry 356 may be configured to facilitate communication via one or more wired media and/or protocols (e.g., Ethernet cable(s), universal serial bus cable(s), etc.) and/or wireless mediums and/or protocols (e.g., near field communication (NFC), ultra high frequency radio waves (commonly known as Bluetooth), IEEE 802.11x, Zigbee, HART, LTE, Z-Wave, WirelessHD, WiGig, etc.).

In some examples, the HMI 352 may comprise a touch screen interface and/or one or more input devices (e.g., keyboard, buttons, knobs, microphones, etc.) and/or output devices (e.g., display screen, speakers, etc.). In some examples, the HMI 352 may further include one or more receptacles configured for connection to (and/or reception of) one or more external memory devices (e.g., floppy disks, compact discs, digital video discs, flash drives, etc.). In operation, an operator 116 or other user may provide input (e.g., monitoring input) to, and/or receive output from, the user device 350 via the HMI 352. In the example of FIG. 3, the memory stores a user device monitoring program 600, further discussed below.

FIG. 3 additionally shows example components of the central monitoring station 302. As shown, the central monitoring station 302 includes communication circuitry 306, processing circuitry 308, and memory 310, interconnected with one another via a common electrical bus. In some examples, the processing circuitry 308 may comprise one or more processors. In some examples, the communication circuitry 306 may include one or more wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the communication circuitry 306 may be configured to facilitate communication via one or more wired media and/or protocols (e.g., Ethernet cable(s), universal serial bus cable(s), etc.) and/or wireless mediums and/or protocols (e.g., near field communication (NFC), ultra high frequency radio waves (commonly known as Bluetooth), IEEE 802.11x, Zigbee, HART, LTE, Z-Wave, WirelessHD, WiGig, etc.). In some examples, the central monitoring station 302 may be implemented by way of a desktop computer or central server computer. In some examples, the memory 310 may store the central data repository 400. In the example of FIG. 3, the memory 310 stores a central monitoring program 700, further discussed below.

Figure 4:
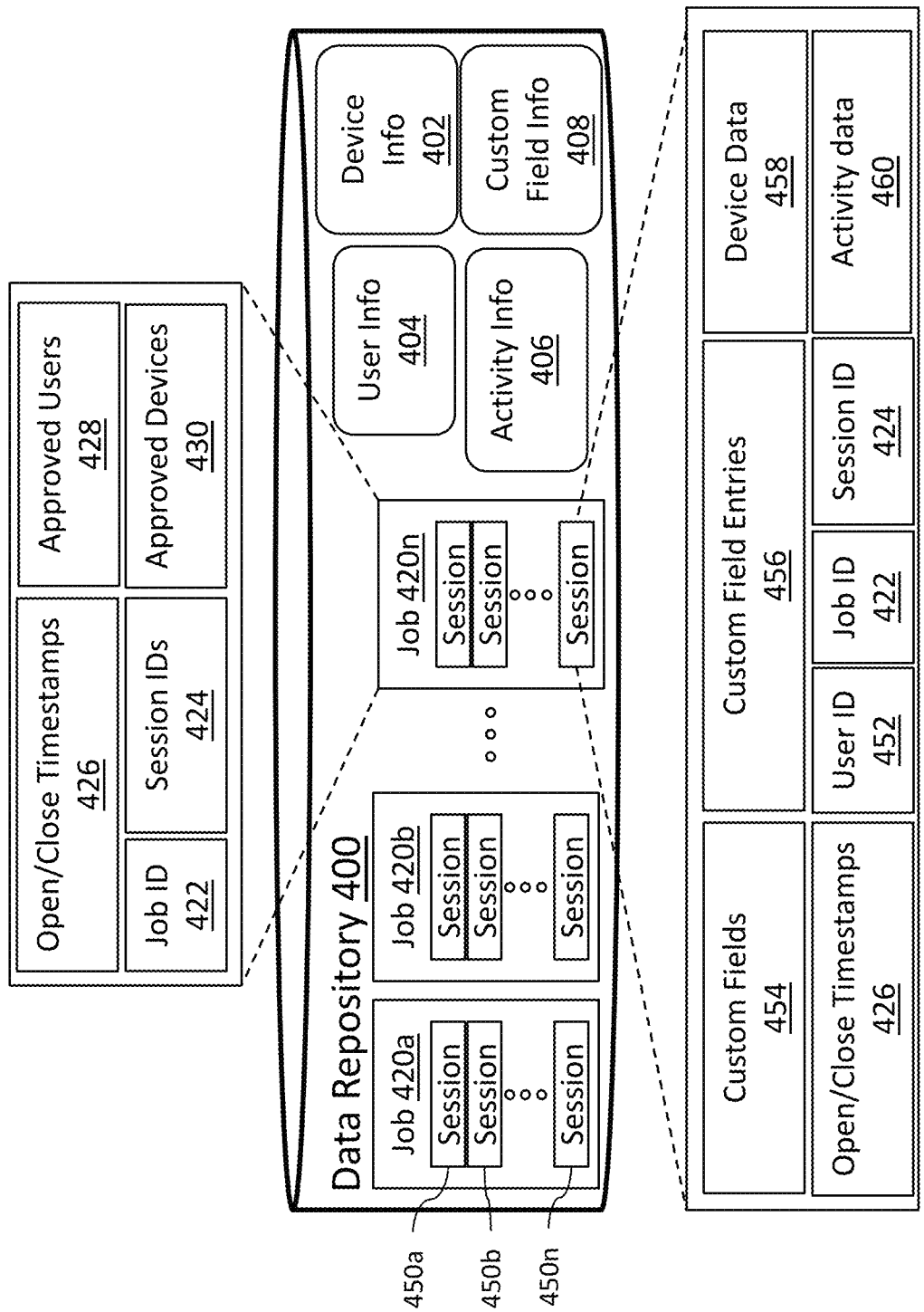
FIG. 4 shows an example data repository of the example distributed weld monitoring system of FIG. 3, with data organized according to jobs and job sessions, in accordance with aspects of this disclosure.

FIG. 4 shows a more detailed example of the central data repository 400. In some examples, the central data repository 400 and local data repository 204 may be similarly (or identically structured). In some examples, the central data repository 400 and/or local data repository 204 may be implemented via one or more databases, database tables, and/or other data structures.

In the example of FIG. 4, the central data repository 400 stores welding device information 402, user information 404, activity information 406, and custom field information 408. In some examples, the central data repository 400 may also include additional information, such as, for example, local monitoring station information, central monitoring station information, and/or other relevant information. In some examples, the welding device information 402, user information 404, activity information 406, custom field information 408, and/or other information may be modified by user input (e.g., by a user with certain administrative privileges via the user device 350 and/or local monitoring station 200), programmatic input, and/or other appropriate mechanisms.

In some examples, the welding device information 402 may include one or more welding device identifiers. In some examples, each welding device identifier may be uniquely associated with a specific welding device 399, as well as information about that welding device 399, such as, for example, device type (e.g., MIG gun, TIG torch, wire feeder, AC welding-type power supply, DC welding-type power supply, gas supply, etc.), device location, approved users for device, approved jobs for device, associated local monitoring station 200, manufacturer, model number, serial number, maintenance history, software revisions, etc. In some examples, the user information 404 may include one or more user identifiers. In some examples, each user identifier 452 may be associated with a particular user (e.g., an operator 116), as well as information about the user, such as, for example, name, age, experience, certifications, certification levels, approved devices for user, approved jobs for user, login credentials, work schedule(s), training history, operational history, assigned tasks, assigned workflow items, assigned work orders, etc.

In some examples, the activity information 406 may include information about various known activities and/or recorded activities that take place during a job session 450. Such activities might include, for example, welding device related activities (e.g., normal operation, maintenance operation, startup operation, shutdown operation, etc.), maintenance activities, quality assurance activities, resupply activities, replacement activities, break activities, error related activities, training activities, meeting activities, and/or other activities. In some examples, some or all of the activities may be associated with one or more timestamps, identifying dates and/or times when the activities have occurred and/or are expected to occur. In some examples, some or all of the activities may be associated with one or more custom fields. In some examples, each activity may be uniquely associated with an activity identifier.

In some examples, the custom field information 408 may include information about various custom fields used by the distributed weld monitoring system 300. In some examples, the custom field information 408 may include one or more custom field identifiers. In some examples, each custom field identifier may be uniquely associated with a particular custom field. In some examples, the custom field information 408 may include other information about each custom field, such as, for example, name, type (e.g., Boolean, text, drop down list, numerical, date, checkbox, radio button, etc.), entry options (e.g., options for drop down, checkboxes, radio buttons, etc.), prompt(s) (e.g., enter: wire feed speed, wire type, wire size, gas type, work order identifier, operator certification level, workpiece material, joint number, operational suggestions, operational problems, corrective actions, notes for management, etc.), description, obligation (e.g., required/optional for everyone or particular users/jobs/devices, etc.), associated jobs 420, associated activities, associated users, associated welding devices 399, and/or other relevant information.

In some examples, custom fields may be associated with different jobs 420, welding devices 399, users, activities, etc. to collect different information from a user depending on the job 420, welding device 399, user, activity, etc. For example, a user (and/or administrator) might create a numerical custom field and associated prompt asking for wire size, and associate the custom field with all wire feeder welding devices 399. In such an example, any time a user starts a job session 450 and specifies a wire feeder as the welding device 399, the wire size custom field and prompt will be presented. As another example, a user (and/or administrator) might create a Boolean custom field and associated prompt asking if a certain certification level has been reached, and associate the custom field with certain jobs 420 (e.g., more complex jobs). In such an example, any time a user starts a job session 450 for that particular job 420, the certification level custom field and prompt will be presented. In some examples, entries into the custom fields (i.e., custom field entries 456) may be stored within central data repository 400 (and/or local data repository) and/or associated with a particular job session 450.

Figure 5:
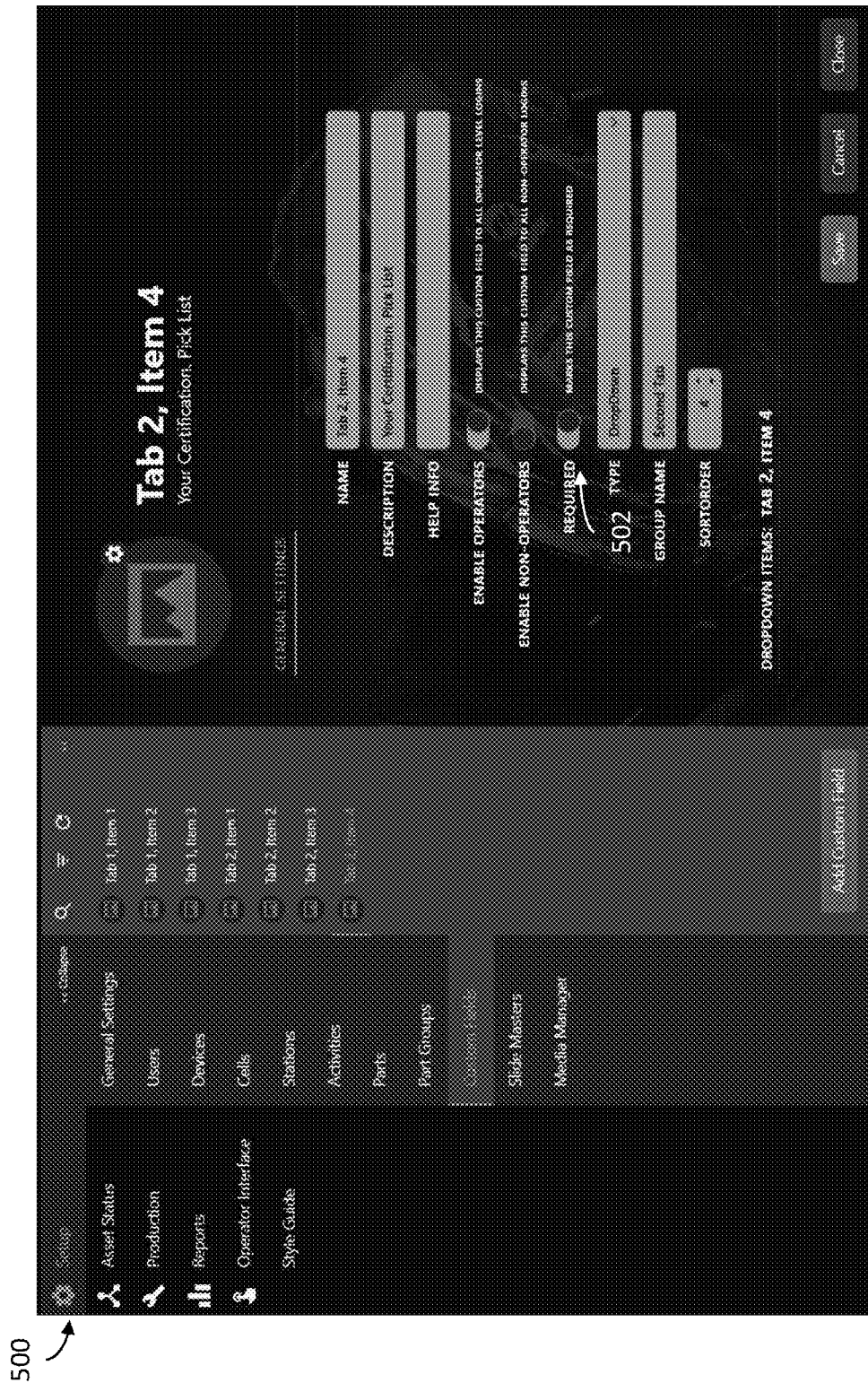
FIG. 5 is an example custom field setup screen, in accordance with aspects of this disclosure.

FIG. 5 shows an example custom field setup screen 500. In some examples, the custom field setup screen 500 may be presented to a user (e.g., a user with administrative privileges) during a setup of the distributed weld monitoring system 300. As shown, the custom field setup screen 500 allows for entry of a name, description, help information, and field type. As shown, the custom field setup screen 500 also allows for the custom field to be marked as either required or optional, via the button 502.

In the example of FIG. 4, the central data repository 400 also stores data relating to several jobs 420. As shown, each job 420 comprises several job sessions 450. FIG. 4 further illustrates example monitoring data associated with each job 420 and job session 450. As shown, each job 420 is associated with a job identifier 422, one or more session identifiers 424, open/close timestamps 426, approved users 428, and approved welding devices 430.

As shown, each job session 450 is associated with open/close timestamps 426, a user identifier 452, a job identifier 422, a session identifier 424, custom fields 454, custom field entries 456, device data 458, and activity data 460. In some examples, the custom fields 454 may be stored as part of the overall job 420 rather than, or in addition to, the individual job session 450. In some examples, each job 420 and/or job session 450 may be associated more or less data than shown in the example of FIG. 4. For example, each job 420 may be associated with a textual description of the job 420, a due date, specifications, schematics, estimated number of man hours and/or arc time to complete, budget, and/or other information and/or materials pertaining to the job 420.

In some examples, each job 420 is associated with a job identifier 422 that is not associated with any other job 420. In some examples, each job session 450 is associated with a job session identifier 424 that is not associated with any other job session 450. In some examples, each user is associated with a user identifier 452 that is not associated with any other user. In some examples, each welding device 399 is associated with a welding device identifier that is not associated with any other welding device 399. In some examples, each job identifier 422, user identifier 452, and/or device identifier, may be automatically generated by the central data repository 400, local data repository 204, central monitoring station 302, or local monitoring station 200.

In some examples, one or more (or no) job sessions 450 may be associated with a job 420 through the session identifiers 424 of the job 420. In some examples, one or more (or no) users may be associated with a job 420 through the approved users 428 of the job 420. In some examples, one or more (or no) welding devices 399 may be associated with a job 420 through the approved welding devices 430 of the job 420. In this way, the monitoring data of the distributed weld monitoring system 300 can be organized according to jobs 420 and job sessions 450.

In some examples, the open/close timestamps 426 of each job 420 and/or job session 450 may comprise timestamps representative of a date and/or time when the job 420 and/or job session 450 is opened and/or closed. In some examples, each opened job 420 and/or job session 450 may have an open timestamp. However, in some examples, a job 420 and/or job session 450 may only have a close timestamp if the job 420 and/or job session 450 has been closed. Thus, in some examples, a job 420 and/or job session 450 that is still open may have no close timestamp, so as to identify the job 420 and/or job session 450 as open. In some examples, each job 420 and/or job session 450 may additionally, or alternatively, be associated with an explicit flag that indicates whether the job 420 and/or job session 450 is open or closed.

In some examples, the approved users 428 for each job 420 comprises data identifying (e.g., via user identifier 452) one or more operators 116 that are approved to work on the job 420. In some examples, this information may be used by the distributed weld monitoring system 300 to determine what jobs 420 to present to a user as options when beginning a job session 450, compiling reports, performing analysis, etc. In some examples, the approved welding devices 430 for each job 420 comprises data identifying (e.g., via welding device identifier) one or more welding devices 399 that are approved for the job 420. In some examples, this data may be used by the distributed weld monitoring system 300 to determine what welding devices 399 to present to a user as options when beginning a job session 450, compiling reports, performing analysis, etc.

In the example of FIG. 4, each job session 450 is associated with a single user (e.g., via user identifier 452) and single job 420 (e.g., via job identifier 422). In some examples, each job session 450 is only associated with a single user, and no job session 450 may be associated with more than one user. In some examples, each job session 450 is also associated with only a single job 420, and no job session 450 may be associated with more than one job 420.

In the example of FIG. 4, each job session 450 is also associated with one or more (or no) custom fields 454. In some examples, each custom field 454 associated with a job session 450 (and/or job 420) is also associated with one of the custom fields of the custom field information 408. The custom field entries 456 shown in FIG. 4 as part of the job session 450 comprise entries inputted by a user in the one or more custom fields 454 (e.g., via the HMI 352 of a user device 350).

In the example of FIG. 4, each job session 450 is associated with welding device data 458. In some examples, each job session 450 may be associated with a single welding device 399 (or no welding device 399), and no job session 450 may be associated with more than one welding device 399. In some examples, the welding device data 458 may include data identifying the single welding device 399 associated with the job session 450, to the extent there is such a welding device 399. For example, the welding device data 458 may include a welding device identifier that corresponds to a welding device identifier of the welding device information 402. In some examples, the welding device data 458 may additionally include welding data received from the welding device 399. For example, welding data may be continually collected from the welding device 399 by the local monitoring station 200 and stored in the welding device data 458 of the local data repository 204, which may then be synched with the welding device data 458 of the central data repository. In some examples, the welding device data 458 may additionally comprise one or more timestamps associated with the welding data.

In the example of FIG. 4, each job session 450 is also associated with activity data 460. In some examples, the activity data 460 may comprise data pertaining to one or more activities that occur during the job session 450. In some examples, the each activity may be related to the welding device 399 being used by the operator 116 or to some activity of the separate from the welding device 399. In some examples, the activity data 460 may include one or more timestamps associated with each activity (e.g., noting the time period(s) the activity are taking place). In some examples, one or more activities for each job session 450 may be automatically determined by the distributed weld monitoring system 300 (e.g., using the known activities stored in the activity information 406), selected by the user from several options (e.g., pulled from the activity information 406), and/or manually input by the user.

Figure 6A:
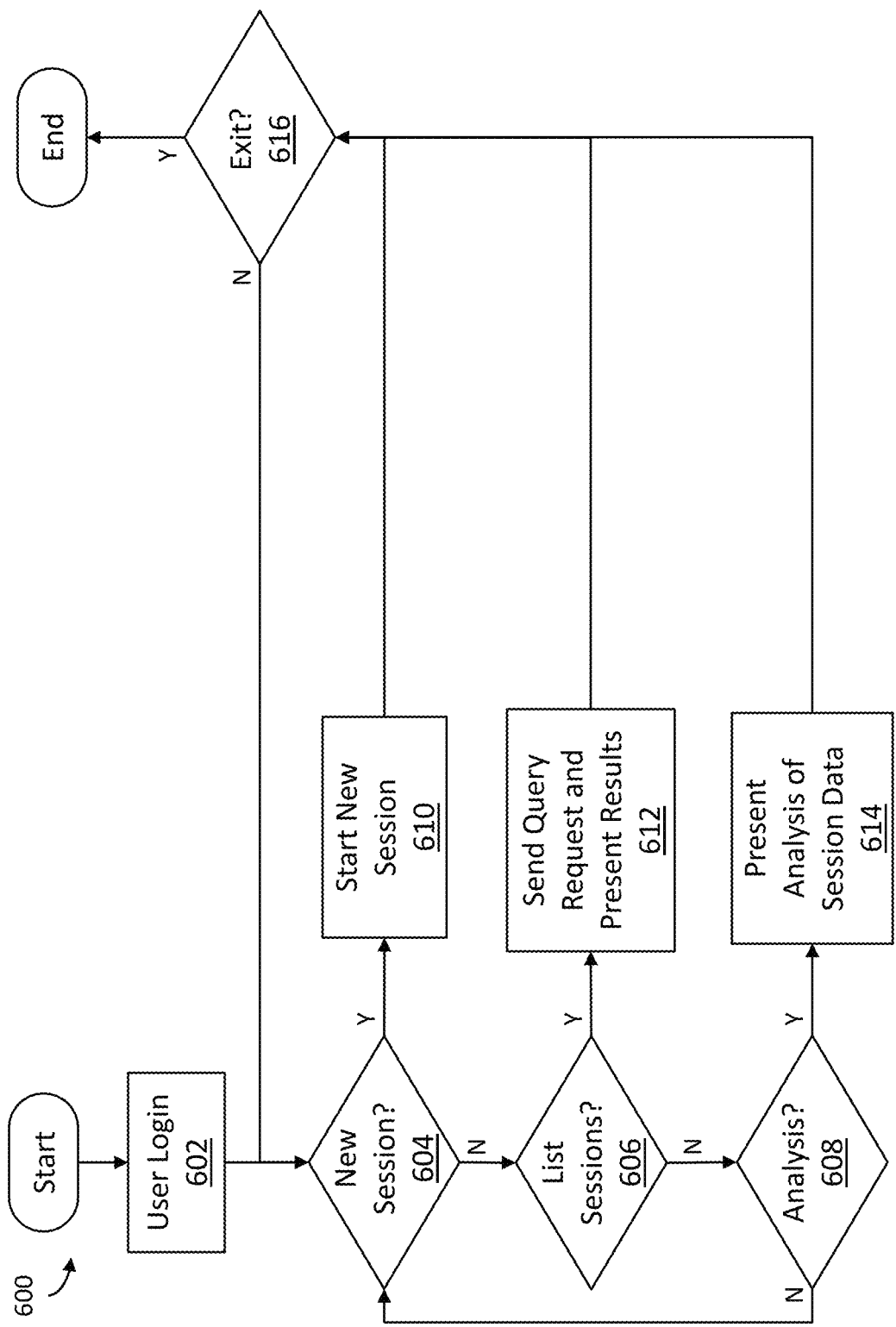
FIG. 6a is a flow diagram illustrating an example user device monitoring program of the example distributed weld monitoring system of FIG. 3, in accordance with aspects of this disclosure.

FIG. 6a is a flowchart illustrating an example user device monitoring program 600 of the distributed weld monitoring system 300. In some examples, the user device monitoring program 600 may be implemented in machine readable instructions stored in memory 360 of the user device 350 and/or executed by the processing circuitry 358 of the user device 350. In some examples, the user device monitoring program 600 may be a web based application, sent to the user device 350 and/or executed through a web browser, for example. In some examples, the user device monitoring program 600 may communicate (e.g., via communication circuitry 356 of the user device 350) with the central monitoring station 302 and/or the local monitoring station 200 in operation of the user device monitoring program 600.

In the example of FIG. 6a, the user device monitoring program 600 begins at block 602, where the user logs in using user credentials. In some examples, the user device 350 may send the credentials to the central monitoring station 302 at block 602, and wait for an affirmative response before proceeding to the block 604 of the user device monitoring program 600. In some examples, the central monitoring station 302 may access the user information 404 of the central data repository 400 to verify the user credentials.

In the example of FIG. 6a, the user device monitoring program 600 allows for several options at blocks 604-608 after block 602. At blocks 604-608, the user is given the option of either beginning a new job session 450 (block 604), being presented with a list of existing job sessions 450 (block 606), or analyzing the monitoring data stored in the central data repository 400. In some examples, the user may be presented with more or less options than shown in FIG. 6a. For example, the user may be presented with additional administrative options if the user credentials are associated with certain administrative privileges. Such additional administrative options may include, for example, the option to create and/or edit information (and/or associations) relating to jobs 420, welding device information 402, custom fields information 408, activity information 406, local monitoring stations 200, the central monitoring station 302, user information 404, user devices 350, and/or other aspects of the distributed weld monitoring system 300 (see, e.g., FIG. 5). As another example, the user may only be given the option of being presented with a list of existing job sessions 450 (block 606), or analyzing the jobs 420 and/or job sessions 450 if their user credentials are associated with adequate administrative privileges.

In the example of FIG. 6a, the user device monitoring program 600 proceeds to block 610 if the user selects to start a new job session 450 at block 604. Block 610 is further explained below. In the example of FIG. 6a, the user device monitoring program 600 proceeds to block 612 if the user selects to list existing job sessions 450 at block 606. At block 612, the user device sends a query request to the central monitoring station 302, receives a response from the central monitoring station 300 that include result data of the query request, and outputs the result data to the user via the HMI 352 of the user device 350.

In some examples, the query request sent to the central monitoring station 300 at block 612 may request data pertaining to one or more job sessions 450 that meet certain search criteria. In some examples, the search criteria may be entered by the user via the HMI 352 of the user device 350. In some examples, the search criteria may comprise one or more jobs 420, welding devices 399, open/close timestamps 426, activities, status (e.g., open or closed), and/or other monitoring data. In some examples, the user's credentials may be automatically included as part of the search criteria. In some examples, the user (and/or user identifier 452) may be a selectable search criteria (e.g., where the logged in user has credentials associated with certain administrative privileges).

Figure 6B:
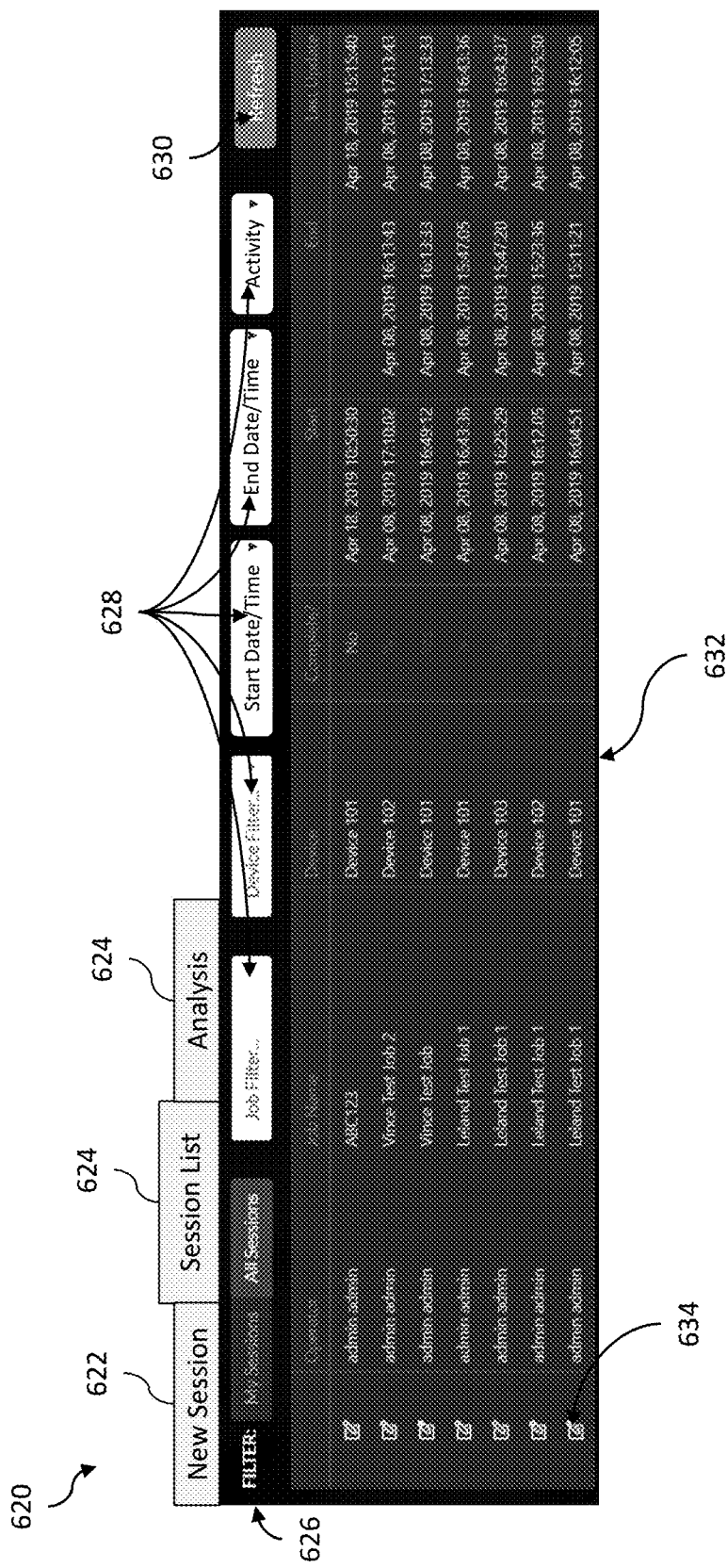
FIG. 6b is an example session list screen, in accordance with aspects of this disclosure.

FIG. 6b shows an example of a session list screen 620 that might be displayed to a user via the HMI 352 of the user device 350 at block 612 of the user device monitoring program 600. As shown, the session list tab 624 is selected and emphasized such that it is larger than the new session tab 622 and analysis tab 626. A user filter 626 has been set to "My Sessions" to automatically use the current login credentials for the search criteria. In some examples, the session list screen 620 might allow for entry of some identification information (e.g., name, user identifier 452, etc.) of a different operator if "All Sessions" was instead selected. As shown, the session list screen 620 further displays search criteria fields 628 for job 420, welding device 399, open/close timestamps 426, and activities. In some examples, more or less search criteria fields 628 may be presented.

In the example of FIG. 6b, a refresh button 630 may be selected to submit the query request. As shown, the query request has already been submitted, and the data returned by the central monitoring station 300 is displayed in a result table 632. In the example of FIG. 6b, the result table 632 is organized by rows, with information for the same job session 450 displayed in the same row. As shown, each row of the result table 632 also includes a selectable edit button 634. In some examples, selection of the edit button 634 may allow a user to make changes to some or all of the information pertaining to the job session 450 corresponding to that row of the result table 632. In some examples, the edit button 634 may only be shown or selectable when the user's credentials are associated with certain administrative privileges.

In the example of FIG. 6a, the user device monitoring program 600 proceeds to block 614 if the user selects to perform an analysis at block 608. At block 614 the user device monitoring program 600 provides an analysis of data stored in the central data repository 400. For example, the user device 350 may send a query request to the central monitoring station 302 (similar to block 612) along with an analysis request for a particular analysis to be performed. In some examples, the query request may use one or more of the search criteria described above with respect to block 612.

In some examples, the analysis request may be for a time based analysis, so that the user device monitoring program 600 may present the query result data returned from the central monitoring station 302 in a time synchronized graph, chart, diagram, or other appropriate form showing data over time. In some examples, the analysis request may be for a comparison of data (e.g., monitoring data for one job 420a v. monitoring data for another job 420b). In some examples, the analysis request may be for a completion estimation (e.g., percentage complete, percentage incomplete) and/or estimated time to completion (e.g., arc time, man hour time, session time, etc.) of one or more jobs 420. In some examples, such estimation may be based on recorded information of the job 420 (e.g., entered at setup and/or afterwards) and/or monitoring information (e.g., arc time, session time, normal device activity time, etc.) recorded by the distributed weld monitoring system 300. In some examples, the user device monitoring program 600 may receive the analysis data from the central monitoring station 300 and present the analysis data to the user via the HMI 352 of the user device 350.

In the example of FIG. 6a, the user device monitoring program 600 proceeds to block 616 after any of blocks 610-614. At block 616, the user device monitoring program 600 checks whether the user device monitoring program 600 should be ended. In some examples, the user device monitoring program 600 may be ended at block 616 in response to an explicit request by the user to end the user device monitoring program 600 (e.g., by closing the user device monitoring program 600 and/or an associated web browser), a logout request by the user, an end command received from the central monitoring station 302, and/or other appropriate action and/or input. If the user device monitoring program 600 determines the user device monitoring program 600 should be ended, then an indication that the user device monitoring program 600 is ending may be sent to the central monitoring station 302, along with any additional data necessary, before the user device monitoring program 600 ends. If the user device monitoring program 600 determines that the user device monitoring program 600 should not be ended, then the user device monitoring program 600 returns to block 604.

Figure 6C:
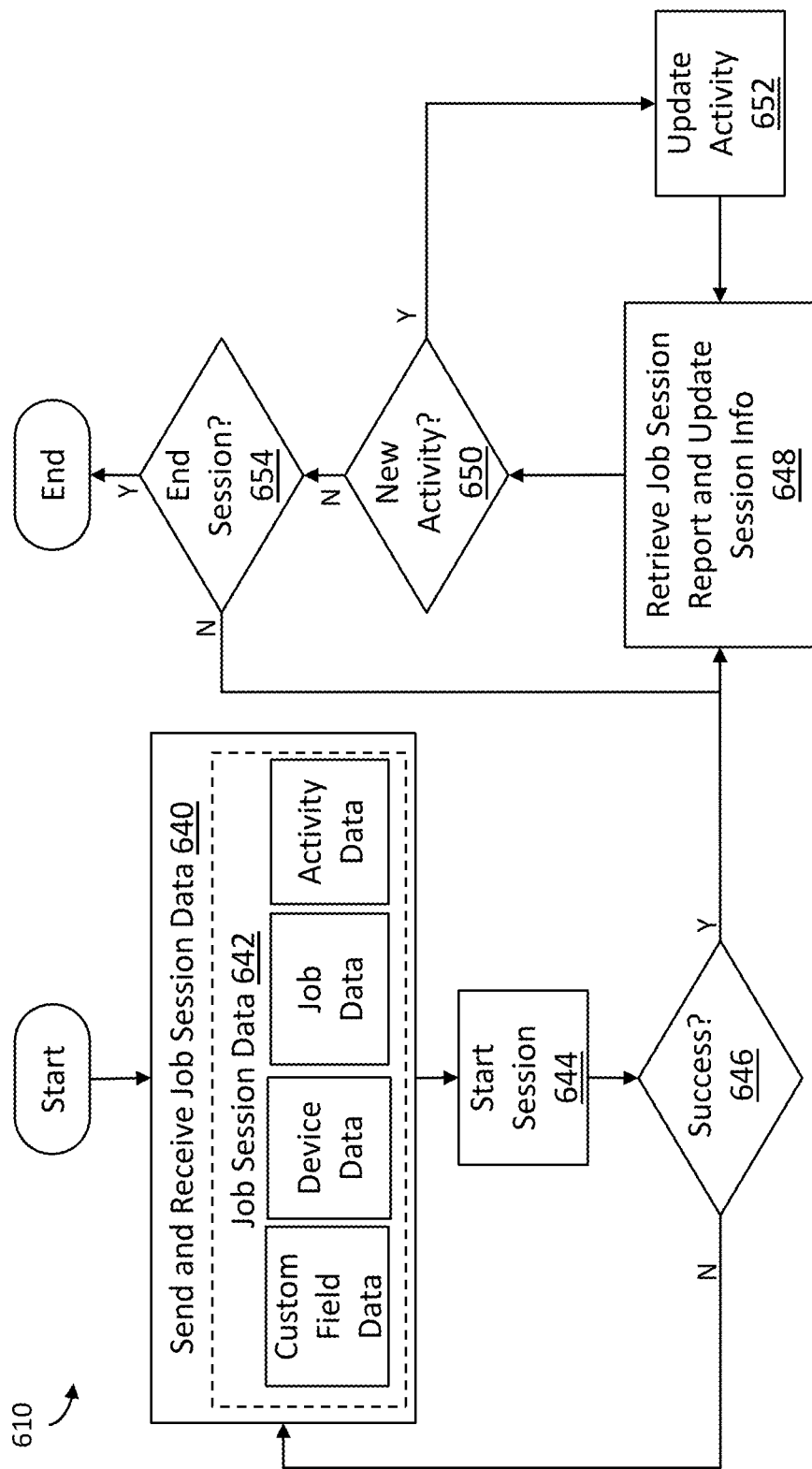
FIG. 6c is a flow diagram illustrating an example start new session block of the user device monitoring program of FIG. 6a, in accordance with aspects of this disclosure.

FIG. 6c is a flowchart illustrating an example implementation of the start new job session block 610 of the example user device monitoring program 600 of FIG. 6a. As shown, the start new job session block 610 begins at block 640. At block 640, the user device monitoring program 600 prompts the user to enter job session data 642, such as, for example, via one or more input fields presented to the user through the HMI 352 of the user device 350. In some examples, the job session data may include an identification of a job 420, custom fields 454, custom field entries 456, welding device data 458, activity data 460, and/or other job session data 642. In some examples, some of the job session data may not need to be entered (e.g., no need for welding device data 458 if no welding device 399 is being used).

In some examples, the user device monitoring program 600 may require an identification of the job before allowing the custom field entries, welding device data 458, and/or activity data 460 to be entered. In some examples, the user device monitoring program 600 may provide the user with input options and/or input prompts for the custom fields 454, welding device data 458, activity data 460, and/or other job session data 642, such as via a dropdown box, checkboxes, and/or dialog buttons, for example. In some examples, the user device monitoring program 600 may send a request to the central monitoring station 302 to obtain the input options and/or input prompts, such as, for example, in response to a user activating the input field (e.g., clicking a dropdown box) or entry of some other job session data. In some examples, the user device monitoring program 600 may provide some or all of the user entered job session data 642 to the central monitoring station 302 in response to user entry and/or selection of one or more input options. In some examples, the input options and/or input prompts provided by the central monitoring station 302 may be dependent upon the user (e.g., the user's credentials and/or associated privileges), and/or the entered job session data 640.

In the example of FIG. 6c, the user device monitoring program 600 proceeds to block 644 after block 640. In some examples, the transition from block 640 to block 644 may occur in response to user action, such as, for example, activation of a start session button 698 (see, e.g., FIG. 6d). In some examples, the user device monitoring program 600 may require completion of some or all of the job session data 642 before allowing activation of the start session button 698 and execution of block 644. At block 644, the user device monitoring program 600 attempts to start a new job session 450 using the entered job session data of block 640. For example, the user device monitoring program 600 may send some or all of the job session data 642 to the central monitoring station 300 along with a request to start a new job session 450.

In the example of FIG. 6c, the user device monitoring program 600 proceeds to block 646 after block 644. At block 646, the user device monitoring program 600 receives a signal from the central monitoring station 302 indicative of whether the request to start a new job session 450 was a success or failure. If it was a failure, then the user device monitoring program 600 returns to block 640. If the request to start a new job session 450 was a success, then the user device monitoring program 600 begins the job session 450 and proceeds to block 648.

In the example of FIG. 6c, the user device monitoring program 600 retrieves (e.g., requests and/or receives) a job session report from the central monitoring station 302 at block 648. In some examples, the user device monitoring program 600 may additionally provide information from the job session report to the user (e.g., via the HMI 352 of the user device 350) at block 648. In some examples, the job session report may include welding data and/or welding related data such as, for example, arc count, consumable cost, deposition amount, current, voltage, wire feed speed, gas flow, torch work angle, torch travel angle, torch tip to work distance, torch travel speed, torch aim, arc length, and/or other appropriate parameters relating to operation of the welding device. In some examples, the job report may additionally, or alternatively, include other information regarding the job session 450, such as, for example, open/close timestamps 426 of the job session 450, a last updated timestamp, an activity, and/or other relevant information relating to the job session 450.

In the example of FIG. 6c, the user device monitoring program 600 proceeds to block 650 after block 648. At block 650, the user device monitoring program 600 checks whether there is a new activity associated with the job session 450, such as communicated by the central monitoring station 302 or inputted by the user via the HMI 352 of the user device 350. If so, then the user device monitoring program 600 updates a current activity at block 652. In some examples, updating the current activity at block 652 may include sending the current activity to the local monitoring station 200 (e.g., via SignalR). In some examples, the user device monitoring program 600 may request and/or receive information regarding the which local monitoring station 200 to send the current activity at (or before) block 650.

In some examples, the user device monitoring program 600 may receive one or more custom input fields 454 (and/or custom input prompts), and/or one or more requests for updated custom field entries 456 from the central monitoring station 302 and/or local monitoring station 200 in response to the updated current activity. In some examples, the user device monitoring program 600 may provide the one or more one or more custom input fields 454 (and/or custom input prompts) to the user via the HMI 352. In some examples, the user device monitoring program 600 may communicate any user inputs relating to the one or more custom input fields 454 (and/or requests for updated custom field entries 456) to the central monitoring station 302. In the example of FIG. 6c, the user device monitoring program 600 repeats block 648 after block 652.

In the example of FIG. 6c, the user device monitoring program 600 proceeds to block 654 if there is no new activity at block 650. At block 654, the user device monitoring program 600 checks whether the job session 450 should be ended. In some examples, the job session 450 may be ended at block 654 in response to an explicit request by the user to end the job session 450 (e.g., by activating an end session button), a logout request by the user, an end command received from the central monitoring station 302, and/or other appropriate action and/or input. If the user device monitoring program 600 determines the job session 450 should be ended at block 654, then an indication that the job session 450 should be ended is sent to the central monitoring station 302, along with any additional data necessary to end the job session. Afterwards, the user device monitoring program 600 returns to block 616 of FIG. 6a. If the user device monitoring program 600 determines that the job session 450 should not be ended, then the user device monitoring program 600 returns to block 648.

Figure 6D:
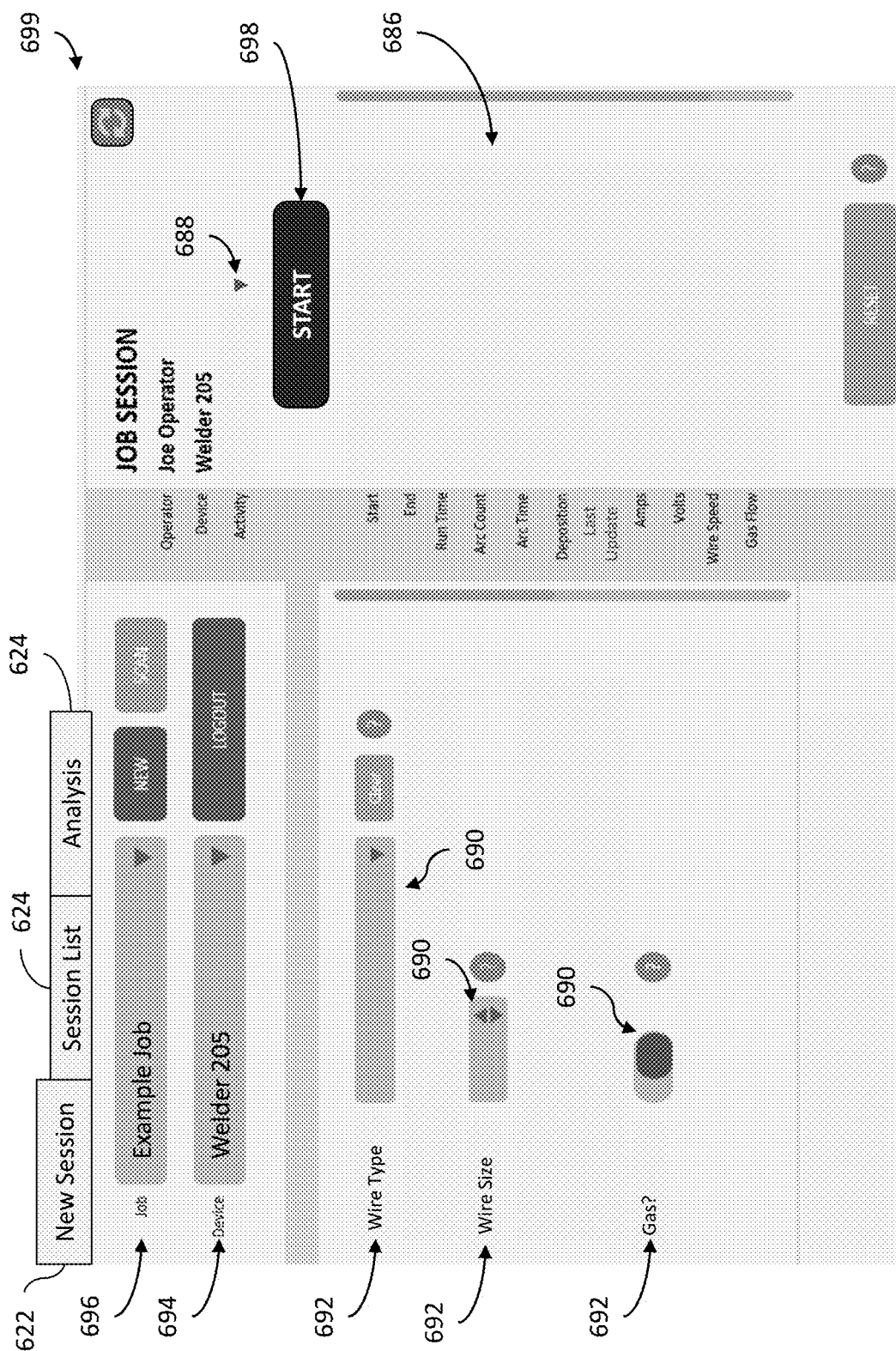
FIG. 6d is an example new session screen, in accordance with aspects of this disclosure.

FIG. 6d shows an example new session screen 699 that might be displayed to a user via the HMI 352 of the user device 350 at block 610 of the user device monitoring program 600. In some examples, the new session screen 699 might be displayed within a web browser of the user device 350. As shown, the New Session tab 622 is selected and emphasized such that it is larger than the Session List tab 624 and Analysis tab 626. In the example of FIG. 6d, the new session screen 699 includes a job input field 696, a welding device input field 694, an activity input field 688, and several custom field prompts 692 and custom input fields 690. As shown, the job input field 696, welding device input field 694, and activity input field 688 are dropdown boxes, while the custom input fields 690 include a dropdown box, a numerical field, and an on/off (i.e., Boolean) button. The new session screen 699 further includes an information panel 686 that can be updated during the job session 450 with information pertaining to the job session 450. The new session screen 699 further includes a start session button 698 that may be activated by a user to start the job session 450. In some examples, the start session button 698 may become an end session button after the session is started.

Figure 7A:
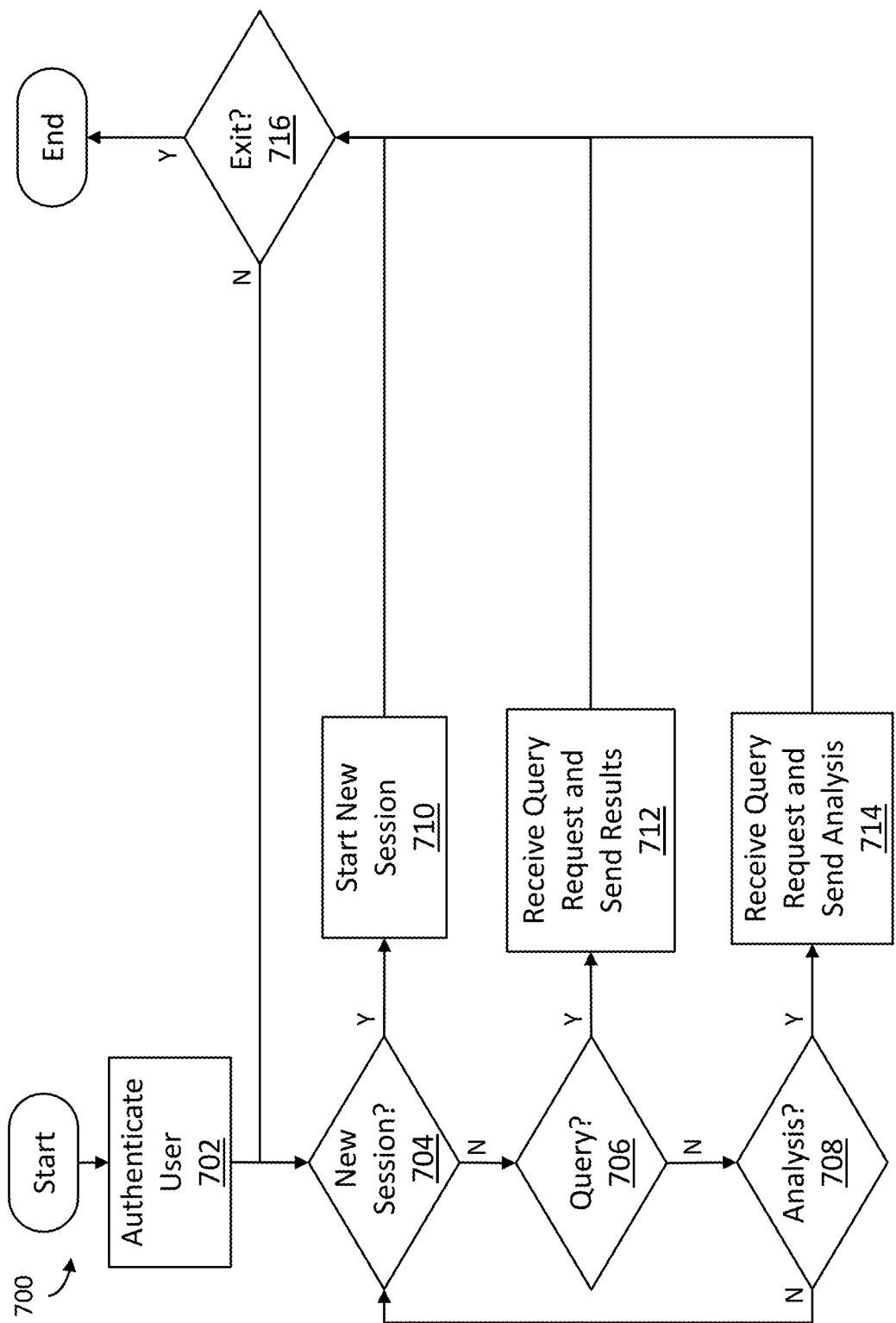
FIG. 7a is a flow diagram illustrating an example central monitoring program of the example distributed weld monitoring system of FIG. 3, in accordance with aspects of this disclosure.

FIG. 7a is a flowchart illustrating an example central monitoring program 700 of the central monitoring station 302. In some examples, the central monitoring program 700 may be implemented in machine readable instructions stored in memory 310 of the central monitoring station 302 and/or executed by the processing circuitry 308 of the central monitoring station 302. In some examples, multiple instances of the central monitoring program 700 may execute at the same time, so as to accommodate multiple user devices 350 and/or instances of the user device monitoring program 600. In some examples, the central monitoring program 700 may communicate (e.g., via communication circuitry 306 of the central monitoring station 302) with the local monitoring station 200 and/or the user device 350 in operation of the central monitoring program 700.

In the example of FIG. 7a, the central monitoring program 700 begins at block 702. At block 702, the central monitoring program 700 receives user credentials from a user device 350 and either authenticates the user credentials (e.g., using the user information 404 of the central data repository 400) or rejects the user credentials after failing to authenticate. In either case, the central monitoring program 700 sends one or more corresponding signals to the user device 350 representative of the user authentication result.

In the example of FIG. 7a, the central monitoring program 700 proceeds to block 704 after block 702. At blocks 704-708, the central monitoring program 700 responds to requests received from the user device 350 (e.g., via one or more signals) to begin a new job session 450 (block 704), handle a query (block 706), and/or handle analysis (block 708). In some examples, the central monitoring program 700 may be configured to respond to more or fewer requests. For example, the central monitoring program 700 may be configured to respond to one or more signals indicative of one or more administrative requests if the user credentials are associated with certain administrative privileges. Such additional administrative requests may include, for example, a request to create and/or edit information (and/or associations) relating to jobs 420, job sessions 450, welding device information 402, user information 404, activity information 406, custom field information 408, local monitoring stations 200, the central monitoring station 302, user devices 350, and/or other aspects of the distributed weld monitoring system 300 (see, e.g., FIG. 5). In some examples, the central monitoring program 700 may respond negatively (e.g., with an error, refusal, denial, etc.) to administrative, query, and/or analysis requests if the user credentials received at block 702 are not associated with adequate administrative privileges.

In the example of FIG. 7a, the central monitoring program 700 proceeds to block 710 if a request is received (e.g., from the user device 350) to start a new job session 450 at block

704. Block 710 is further explained below. In the example of FIG. 7*a*, the central monitoring program 700 proceeds to block 712 if a query request is received at block 706. At block 712, the central monitoring program 700 receives the query request along with search criteria on which the query is to be based, and performs the query on the central data repository 400 using the search criteria. The central monitoring program 700 then sends the query results back to the user device 350.

In the example of FIG. 7*a*, the central monitoring program 700 proceeds to block 714 if an analysis request is received at block 708. At block 714 the central monitoring program 700 receives a query request along with search criteria and an analysis request. The central monitoring program 700 performs the query using the search criteria, similar to block 712, and the central data repository 400 returns query result data in response to the query. The central monitoring program 700 further formats, structures, and/or processes the query result data based on the analysis request, so that the query result data may be appropriately presented to the user in a useful and/or actionable format. For example, the central monitoring program 700 may receive an analysis request for time synchronized query result data, and the central monitoring program 700 may format and/or structure the query result data such that the query result data may be presented in a time synchronized graph, chart, diagram, or other appropriate form showing data over time. As another example, the analysis may be for a comparison of data, and the central monitoring program 700 format and/or structure the query result data such that the query result data may be presented in a graph, chart, diagram, or other appropriate form showing a comparison of the data based on or more criteria (e.g., identified in the analysis request). As another example, the analysis may be for a completion estimation (e.g., percentage complete, percentage incomplete) and/or estimated time to completion (e.g., arc time, man hour time, session time, etc.) of one or more jobs 420. In such an example, the central monitoring program 700 may query the central data repository 400 to determine how much time (e.g., arc time, session time, normal device activity time, etc.) the job 420 is estimated to require and/or how much time has been recorded for the job 420 (e.g., in all its associated job sessions 450, some date/time limited portion of associated job sessions 450, etc.), and return analysis results based on this processing.

In the example of FIG. 7*a*, the central monitoring program 700 proceeds to block 716 after any of blocks 710-714. At block 716, the central monitoring program 700 checks whether the central monitoring program 700 should be ended. In some examples, the central monitoring program 700 may be ended at block 716 in response to an explicit request by the user, a logout request by the user, and/or other appropriate action and/or input. If the central monitoring program 700 determines the central monitoring program 700 should be ended, then an indication that the user device monitoring program 600 is ending may be sent to the user device 350 and/or local monitoring station 200, along with any appropriate information. If the central monitoring program 700 determines that the central monitoring program 700 should not be ended, then the central monitoring program 700 returns to block 704.

Figure 7B:
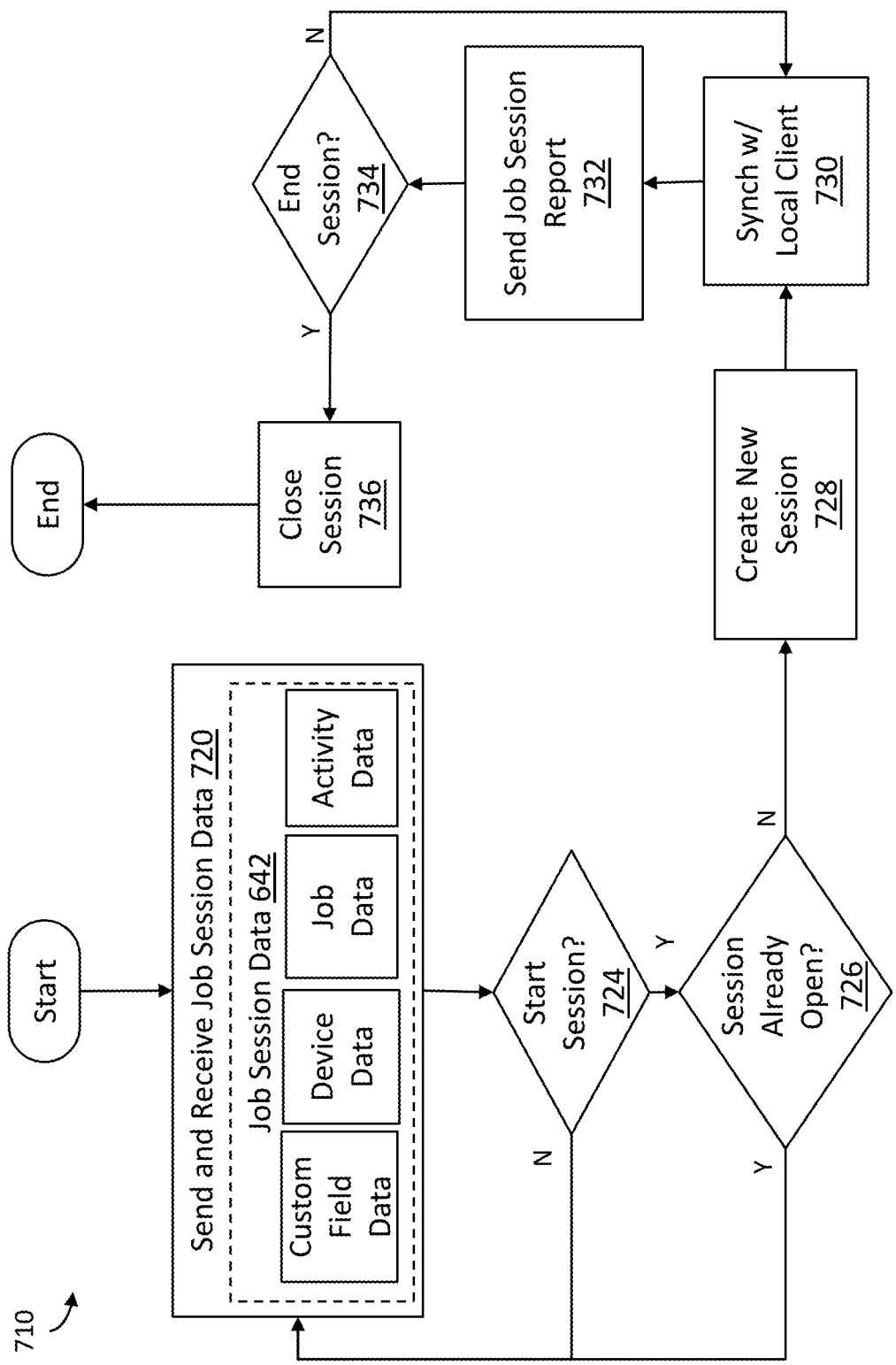
FIG. 7b is a flow diagram illustrating an example start new session block of the central monitoring program of FIG. 7a, in accordance with aspects of this disclosure.

FIG. 7*b* is a flowchart illustrating an example implementation of the start new job session block 710 of the example central monitoring program 700 of FIG. 7*a*. As shown, the start new job session block 710 begins at block 720. At block 720, the central monitoring program 700 sends job session data 642 to the user device 350. For example, the central monitoring program 700 may provide one or more jobs 420 available for selection by the user. The central monitoring program 700 additionally receives job session data 642 from the user device 350, such as, for example, a selection (and/or identification) of a job 420. In some examples, multiple iterations of sending and receiving job session data 642 (e.g., custom fields 454, custom field entries 456, welding device data 458, activity data 460, and/or other job session data 642) may occur at block 720. In some examples, some of the job session data may not need to be received (e.g., no need for welding device data 458 if operator 116 is not using a welding device 399).

In some examples, the central monitoring program 700 may also provide selection options (e.g., for custom field entries 456, welding device data 458, activity data 460, and/or other job session data 642) and/or custom fields 454 based on the provided job session data 642 and/or the user credentials at block 720. In some examples, this may occur in response to a user activating an input field (e.g., clicking a dropdown box) or entry of some job session data 642. In some examples, the central monitoring program 700 may query the central data repository 400 to determine the one or more selection options and/or custom fields 454. In such an example, the central monitoring program 700 may use as search criteria the user credentials (and/or associated privileges) and/or some or all of the received job session data 642. For example, the central monitoring program 700 may receive a request for selections options for a welding device 399, and the central monitoring program 700 may query the central data repository 400 (e.g., the welding device information 402) to determine what welding devices 399 may be used given the current user and/or currently selected job 420. The result data from the query may then be sent to the user device 350 in response to the request.

In the example of FIG. 7*b*, the central monitoring program 700 proceeds to block 724 after block 720. At block 724, the central monitoring program 700 checks whether a request to start a new session has been received. If such a request has not been received, the central monitoring program 700 returns to block 720. If a request to start a new session has been received, the central monitoring program proceeds to block 725.

In the example of FIG. 7*b*, the central monitoring program 700 determines whether there is already an open job session 450 with the entered job session data 642 from block 720. In some examples, this determination may comprise querying the central data repository 400 to see if there is a job session 450 associated certain search criteria, such as, for example, user credentials and/or one or more of the entered job session data 642 entered at block 720 (e.g., welding device data 458). If there is such a job session 450, the central monitoring program 700 may then determine whether the job session 450 is open, such as if, for example, the job session 450 has an open timestamp and no close timestamp (e.g., in the open/close timestamp 426).

In the example of FIG. 7*b*, the central monitoring program 700 returns to block 720 and sends an error signal (and/or reason for the error) to the user device 350 if there is an open job session 450 associated with the search criteria. If there is no open job session 450 associated with the search criteria, the central monitoring program 700 proceeds to block 728. At block 728, the central monitoring program 700 creates a new job session 450 in the central data repository 400, using the job session data 642 entered at block 720. In some examples, the central monitoring program 700 may also send a signal to the user device 350 indicative of a successful creation of the new job session 450.

In the example of FIG. 7b, the central monitoring program 700 proceeds to block 730 after block 728. At block 730, the central monitoring program 700 synchronizes the central data repository 400 with the local data repository 204. In some examples, the synchronization at block 730 may occur in response to a synchronization request from the local monitoring station 200 (and/or local data repository 204), a job report request from the user device 350, and/or an expiration of a threshold synchronization time period (e.g., stored in memory 310 and/or the central data repository 400). In some examples, the central data repository 400 may need to be synchronized with the local data repository 204 to retrieve welding data received at the local data repository 204 from the welding device 399 associated with the job session 450. In some examples, the central monitoring program 700 may determine which local monitoring station 200 to synchronize with based on the welding device 399 associated with the newly created job session 450. Additionally, the local monitoring station 200 may perform activity tracking functions, and store the activity related data in the local data repository 204 until synchronization. In examples where there is no welding device 399 associated with the new job session 450, the central monitoring program 700 may synchronize with a default or most recent local monitoring station 200.

In the example of FIG. 7b, the central monitoring program 700 proceeds to block 732 after block 730. At block 732, the central monitoring program 700 sends a job session report to the user device 350. In some examples, the job session report may include activity tracking information, welding data, timestamp information, and/or other data associated with the job session 450. In some examples, the job session report sent to the user device 350 at block 732 may be used by the user device 350 to update its information panel 686 and/or otherwise be presented to the user.

In the example of FIG. 7b, the central monitoring program 700 proceeds to block 734 after block 732. At block 734, the central monitoring program 700 determines whether the job session 450 should be ended. In some examples, the central monitoring program 700 may determine the job session 450 should be ended at block 734 in response to signal from the user device 350 to requesting to end the job session 450, a determination that the job 420 associated with the job session 450 has ended, and/or other appropriate action and/or input. If the central monitoring program 700 determines the job session should not be ended, the central monitoring program 700 returns to block 730. If the central monitoring program 700 determines the job session 450 should be ended, the central monitoring program 700 proceeds to block 736.

In the example of FIG. 7b, the central monitoring program 700 closes the job session 450 at block 736. In some examples, the central monitoring program 700 may send a signal indicative of the closure to the user device 350 and/or local monitoring station 200, along with any necessary data. After block 736, the central monitoring program 700 returns to block 716 of FIG. 7a.

Figure 8A:
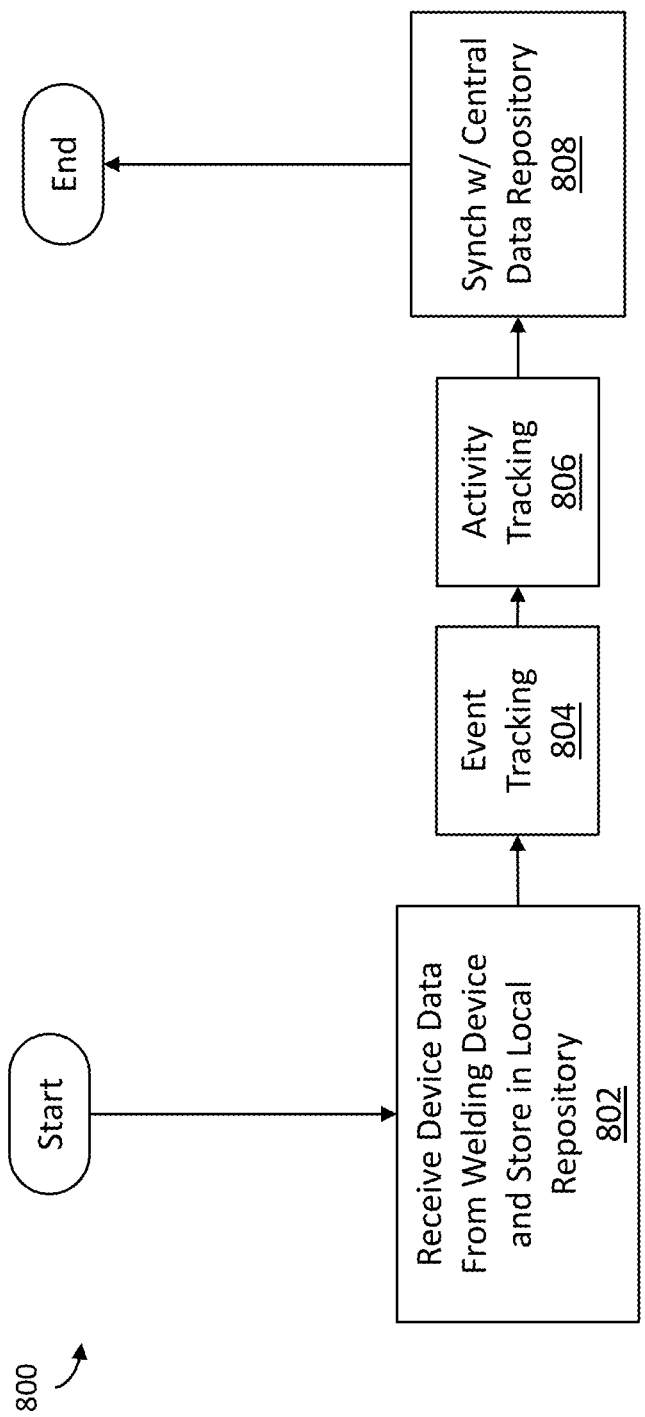
FIG. 8a is a flow diagram illustrating an example local monitoring program of the local monitoring station of FIG. 3, in accordance with aspects of this disclosure.

FIG. 8a is a flowchart illustrating an example local monitoring program 800 of the local monitoring station 200. In some examples, the local monitoring program 800 may be implemented in machine readable instructions stored in memory 210 of the local monitoring station 200 and/or executed by the processing circuitry 208 of the local monitoring station 200. In some examples, the local monitoring program 800 may communicate (e.g., via communication circuitry 206 of the local monitoring station 200) with the central monitoring station 302 and/or one or more welding devices 399 in operation of the local monitoring program 800. In some examples, multiple instances of the local monitoring program 800 may execute at the same time, so as to accommodate multiple welding devices 399 and/or multiple instances of the central monitoring program 700, for example. While FIG. 8a shows a start and end of the local monitoring program 800 for the sake of explanation, in some examples the local monitoring program 800 may continuously execute, repeat, and/or loop.

In the example of FIG. 8a, the local monitoring program 800 begins at block 802. At block 802, the local monitoring program 800 receives welding data from one or more welding devices 399 in communication with the local monitoring station 200. The welding data is further stored in the local data repository 204. In some examples, the welding data may comprise data pertaining to the operation of the welding device 399, such as, for example, arc count, deposition amount, current, voltage, wire feed speed, gas flow, torch work angle, torch travel angle, torch tip to work distance, torch travel speed, torch aim, arc length, and/or other appropriate data relating to operation of the welding device 399. In some examples, the welding device 399 may continuously or periodically communicate the welding data to the local monitoring station 200 while the welding device 399 is performing a welding operation. In some examples, the welding device 399 may communicate the welding data to the local monitoring station 200 in response to a request from the local monitoring station 200.

In the example of FIG. 8a, the local monitoring program 800 proceeds to block 804 after block 802. At block 804, the local monitoring program 800 handles event tracking operations, such as, for example, weld tracking and/or part tracking operations. For example, the local monitoring program 800 may analyze the welding data received at block 802 to detect certain events (e.g., workflow events, part tracking events, trigger activation/deactivation events, arc start/stop events, etc.). For example, welding device 399 may communicate welding data describing data read by a sensor 150 that is indicative of a certain event (e.g., wire spool change, loading of workpiece 110). In such an example, the local monitoring station 200 may determine an event has occurred execute certain instructions (e.g., display schematics, issue alert, etc.) in view of that event. In some examples, the local monitoring program 800 may store data representative of the detected events and/or instructions in the local data repository 204. In some examples, the local monitoring program 800 may associate data representative of the detected events and/or instructions with the welding device 399 from which the welding data was received, and/or the job session 450 with which the welding device 399 is associated, when storing in the local data repository 204.

In the example of FIG. 8a, the local monitoring program 800 proceeds to block 806 after block 804. At block 806 the local monitoring program 800 handles activity tracking operations. In some examples, the activity tracking at block 806 determines what current activity should be recorded and/or associated with a job session 450 and/or welding device 399. The activity tracking operations of block 806 are explained further below with respect to FIG. 8b.

In the example of FIG. 8a, the local monitoring program 800 proceeds to block 808 after block 806. At block 808, the local monitoring program 800 synchronizes the local data repository 204 with the central data repository 400. In some examples, the synchronization at block 808 may occur in response to a synchronization request from the central monitoring station 302, an expiration of a threshold synchronization time period (e.g., stored in memory 210 and/or the local data repository 204), and/or some other occurrence. After block 808, the local monitoring program 800 ends.

Figure 8B:
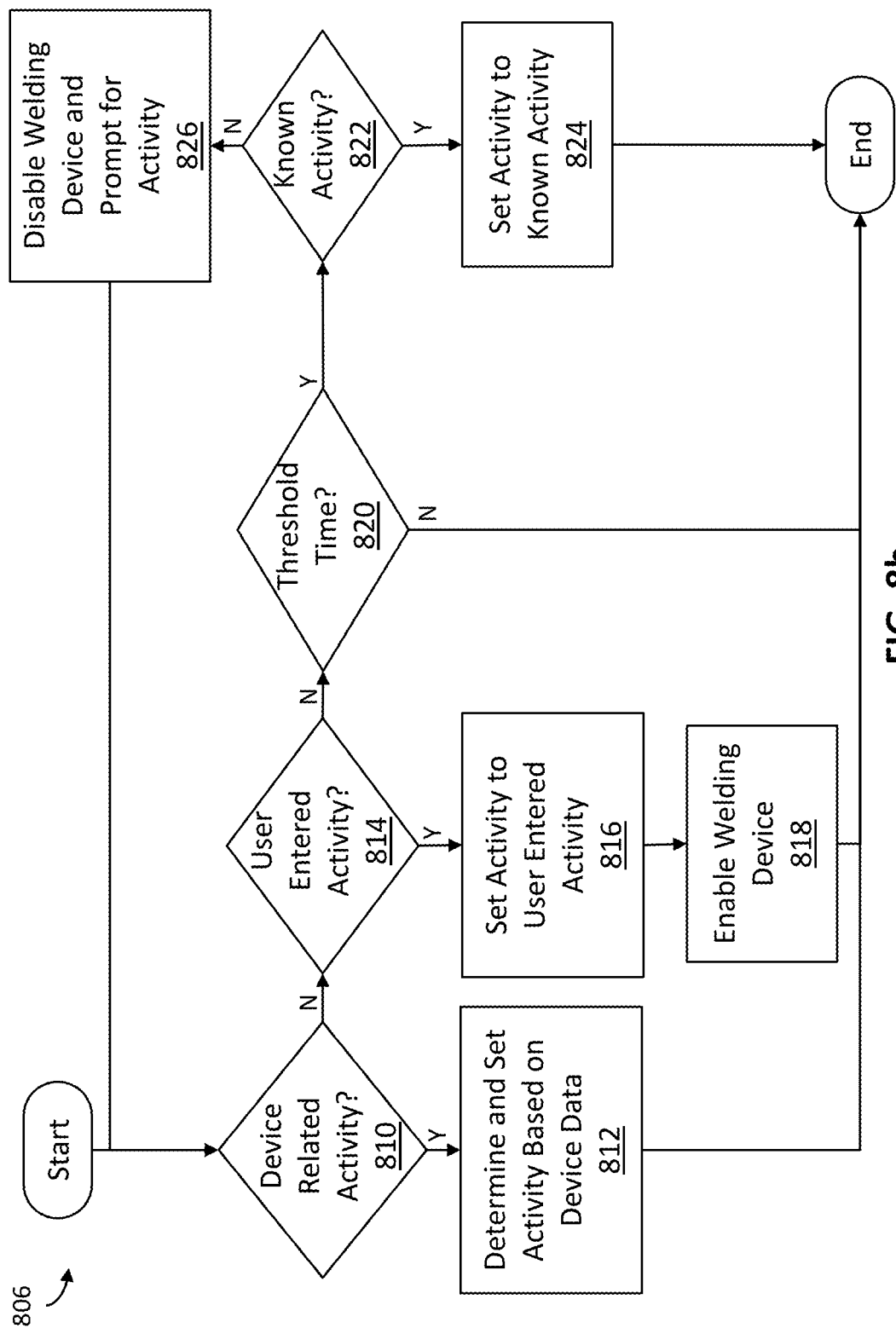
FIG. 8b is a flow diagram illustrating an example activity tracking block of the local monitoring program of FIG. 8a, in accordance with aspects of this disclosure.

FIG. 8b is a flowchart illustrating an example implementation of the activity tracking block 806 of the example local monitoring program 800 of FIG. 8a. As shown, the activity tracking block 806 begins at block 810, where the local monitoring program 800 determines whether the current activity should be recorded as an activity related to the welding device 399. In some examples, this determination may comprise determining whether welding data has been recently (e.g., within some threshold time period) received from a welding device 399 (e.g., a welding device 399 associated with an open job session 450). As shown, if welding data has been recently received, the local monitoring program 800 proceeds to block 812, where the local monitoring program 800 analyzes the welding data, determines a welding device related activity based on the welding data, and sets the current activity to be the welding device related activity. After block 812, the local monitoring program 800 ends. However, if the local monitoring program 800 determines that the current activity is not a welding device related activity at block 810, the local monitoring program 800 proceeds to block 814.

At block 814, the local monitoring program 800 determines whether the local monitoring station 200 has received a user entered activity, such as from the user device 350 (e.g., via SignalR), for example. If a user entered activity has not been received, the local monitoring program 800 proceeds to block 820, which is further discussed below. If a user entered activity has been received, the local monitoring program 800 proceeds to block 816, where the current activity is set to the user entered activity. After block 816, the local monitoring program 800 proceeds to block 818, where the welding device 399 is enabled. After block 818, the local monitoring program 800 ends.

In some examples, the welding device 399 may be enabled through transmission of a signal to from the local monitoring station 200 to the welding device 399. For example, the signal may be indicative of a request to enable the welding device 399. In some examples, the welding device 399 may be a welding-type power supply 108 that has power conversion circuitry 132 that only outputs welding-type power when an the control circuitry 134 sends control signals to controllable switching elements of the power conversion circuitry 132. In some examples, the control circuitry 134 may be configured to cease sending the control signals to the controllable switching elements in response to a disable signal received from the local monitoring station 200, and resume sending the control signals to the controllable switching elements in response to an enable signal received from the local monitoring station 200.

In some examples, the welding device 399 may be a welding-type power supply 108, wire feeder 140, or gas supply 142 that only provides power, wire, and/or gas in response to a trigger signal received from the welding torch 118. In such an example, the welding device 399 may be configured to ignore the trigger signal in response to a disable signal received from the local monitoring station 200, and/or stop ignoring the trigger signal in response to an enable signal received form the local monitoring station 200. In some examples, the welding device 399 may be a welding torch 118 that ceases to send the trigger signal in response to a disable signal received from the local monitoring station 200, and resumes sending the trigger signal in response to an enable signal received form the local monitoring station 200.

In the example of FIG. 8b, the local monitoring program 800 proceeds to block 820 if a user entered activity has not been received. At block 820, the local monitoring program 800 determines whether a threshold time has passed since there has been a user entered activity (e.g., block 814) or an automatically determined welding device 399 related activity (e.g., block 810). In some examples, the threshold time period may be stored in memory 210 of the local monitoring station 200, sent from the central monitoring station 302, programmatically determined (e.g., by the processing circuitry 208 of the local monitoring station 200), user entered, and/or otherwise provided. If the threshold time has not passed, the local monitoring program 800 ends. If the threshold time has passed, the local monitoring program 800 determines there is some sort of downtime and proceeds to block 822.

In the example of FIG. 8b, the local monitoring program 800 determines whether the downtime is due to some known activity. In some examples, this determination may comprise determining whether there are any known activities (e.g., stored with the activity information 406) that overlap in time with the current date/time. For example, the activity information 406 may indicate that there is a scheduled break, shift change, maintenance, resupply, replacement, training, meeting, or other activity that is scheduled to occur at or near the current time. In some examples, the determination may further comprise determining whether any of the known activities that overlap in time are also associated with a user operating the welding device 399 and/or associated with the current job session 450. In some examples, the determination may comprise additional, or alternative, considerations.

In the example of FIG. 8b, if the local monitoring program 800 determines that the downtime is due to a known activity at block 822, that known activity is set as the current activity at block 824, and associated with a time period spanning the threshold time period of block 820 up to the current time at block 824. After block 824, the local monitoring program 800 ends. However, if the local monitoring program 800 determines that there is no known activity to which the downtime may be attributed, the local monitoring program 800 and prompts the user for some activity to which to attribute the downtime at block 826. In some examples, a signal indicative of a prompt for the activity is sent to the user device 350 (e.g., via SignalR) and/or a prompt is presented on the UI 202 of the local monitoring station 200. As shown, the local monitoring program 800 additionally disables the welding device 399 at block 826, such that no further welding operations may be performed using the welding device 399 until some activity is determined. This disabling may incentivize the user to provide an activity to which the downtime may be attributed, which may further ensure that the distributed weld monitoring system 300 receives all the necessary information for monitoring. After block 826, the local monitoring program 800 returns to block 810.

The distributed weld monitoring system 300 allows monitoring data to be input via a user device 350 that may be more easily transported through an expansive work environment than the local monitoring station 200. Additionally, by organizing the monitoring data according to jobs 420 and job sessions 450 when collecting the monitoring data, it becomes possible to view and/or analyze the monitoring data according to each job and/or job session after the job is over, or even while the job is still ongoing, which may assist in analysis. Because the distributed weld monitoring system works best when operators regularly provide monitoring input, in some examples, the distributed weld monitoring system 300 may also take steps to encourage operator input, such as by, for example, disabling one or more welding devices 399 that the operator 116 is using until operator input is forthcoming.

The present method and/or system may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor 130.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, carbon arc cutting, and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging, and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

What is claimed is:

1. A weld monitoring station, comprising:
   communication circuitry configured for communication with a welding device; processing circuitry; and memory circuitry comprising computer readable instructions which, when executed, cause the processing circuitry to:
   receive welding data from the welding device during a first time period, via the communication circuitry, the welding data relating to a welding-type operation,
   determine whether a threshold amount of time has passed since an end of the first time period with no further welding data being received,
   in response to determining the threshold amount of time has passed, determine a downtime exists, and send a disable command to the welding device, via the communication circuitry, the disable command being indicative of a command to disable the welding device from conducting further welding-type operations,
   determine whether there exists a known reason for the threshold amount of time passing with no further welding data being received,
   in response to determining there exists no known reason, determine the downtime is an unknown downtime, and
   prompt a welding operator to identify a downtime activity.

2. The weld monitoring station of claim 1, wherein the memory circuitry comprises computer readable instructions which, when executed, further cause the processing circuitry to record the welding data in a data repository, and associate the welding data with the first time period in the data repository.

3. The weld monitoring station of claim 1, wherein the memory circuitry comprises computer readable instructions which, when executed, further cause the processing circuitry to:
   receive a downtime activity, and
   in response to receiving the downtime activity:
      define a second time period beginning at the end of the first time period,
      record the downtime activity in a data repository,
      associate the downtime activity with the second time period in the data repository, and
      send an enable command to the welding device, via the communication circuitry, the enable command being indicative of a command to re-enable the welding device to conduct welding-type operations.

4. The weld monitoring station of claim 1, wherein the welding device comprises a welding-type power supply, a gas supply, a wire feeder, or a welding torch.

5. The weld monitoring station of claim 1, wherein prompting the welding operator to identify the downtime activity comprises sending a request to a user device associated with the welding operator, via the communication circuitry, or prompting the welding operator via a user interface.

6. The weld monitoring station of claim 1, wherein determining whether there exists a known reason for the threshold amount of time passing comprises checking whether a defined break period, shift change period, maintenance period, quality assurance period, training period, or meeting period overlaps with a second time period beginning at the end of the first time period.

7. A method of tracking activity during a welding session, comprising:
   receiving welding data from a welding device during a first time period, via communication circuitry, the welding data relating to a welding-type operation;
   determining, via processing circuitry, whether a threshold amount of time has passed since an end of the first time period with no further welding data being received;
   in response to determining the threshold amount of time has passed, determining a downtime exists, and sending a disable command to the welding device, via the communication circuitry, the disable command being indicative of a command to disable the welding device from conducting further welding-type operations;
   determining whether there exists a known reason for the threshold amount of time passing with no further welding data being received;
   in response to determining there exists no known reason, determining the downtime is an unknown downtime; and
   prompting a welding operator to identify a downtime activity.

8. The method of claim 7, further comprising recording the welding data in a data repository and associating the welding data with the first time period in the data repository.

9. The method of claim 7, further comprising:
   receiving the downtime activity; and
   in response to receiving the downtime activity:
      defining a second time period beginning at the end of the first time period,
      recording the downtime activity in a data repository,
      associating the downtime activity with the second time period in the data repository, and
      sending an enable command to the welding device, via the communication circuitry, the enable command being indicative of a command to re-enable the welding device to conduct welding-type operations.

10. The method of claim 7, wherein the welding data comprises data pertaining to operation of a welding-type power supply, a gas supply, a wire feeder, or a welding torch.

11. The method of claim 7, wherein prompting the welding operator to identify the downtime activity comprises sending a request to a user device associated with the welding operator, via the communication circuitry, or prompting the welding operator via a user interface.

12. The method of claim 7, wherein determining whether there exists a known reason for the threshold amount of time passing comprises checking whether a break period, shift change period, maintenance period, quality assurance period, training period, or meeting period overlaps with a second time period beginning at the end of the first time period.

13. The method of claim 7, wherein the welding device comprises a welding-type power supply, a gas supply, a wire feeder, or a welding torch.

14. A weld monitoring system, comprising:
a welding device having one or more sensors configured to detect welding data relating to a welding-type operation of the welding device; and
a weld monitoring station in communication with the welding device, the weld monitoring station comprising communication circuitry configured for communication with the welding device, processing circuitry, and memory circuitry comprising computer readable instructions which, when executed, cause the processing circuitry to:
receive the welding data from the welding device during a first time period, via the communication circuitry,
determine whether a threshold amount of time has passed since an end of the first time period with no further welding data being received,
in response to determining the threshold amount of time has passed, determine a downtime exists, and send a disable command to the welding device, via the communication circuitry, the disable command being indicative of a command to disable the welding device from conducting further welding-type operations,
determine whether there exists a known reason for the threshold amount of time passing with no further welding data being received,
in response to determining there exists no known reason, determine the downtime is an unknown downtime, and
prompt a welding operator to identify a downtime activity.

15. The weld monitoring system of claim 14, wherein the memory circuitry comprises computer readable instructions which, when executed, further cause the processing circuitry to record the welding data in a data repository, and associate the welding data with the first time period in the data repository.

16. The weld monitoring system of claim 14, wherein the memory circuitry comprises computer readable instructions which, when executed, further cause the processing circuitry to:
receive the downtime activity, and
in response to receiving the downtime activity:
define a second time period beginning at the end of the first time period,
record the downtime activity in a data repository,
associate the downtime activity with the second time period in the data repository, and
send an enable command to the welding device, via the communication circuitry, the enable command being indicative of a command to re-enable the welding device to conduct welding-type operations.

17. The weld monitoring system of claim 14, wherein the welding data comprises data pertaining to operation of a welding-type power supply, a gas supply, a wire feeder, or a welding torch.

18. The weld monitoring system of claim 14, wherein prompting the welding operator to identify the downtime activity comprises sending a request to a user device associated with the welding operator, via the communication circuitry, or prompting the welding operator via a user interface.

19. The weld monitoring system of claim 14, wherein determining whether there exists a known reason for the threshold amount of time passing comprises checking whether a break period, shift change period, maintenance period, quality assurance period, training period, or meeting period overlaps with a second time period beginning at the end of the first time period.

20. The weld monitoring system of claim 14, wherein the welding device comprises a welding-type power supply, a gas supply, a wire feeder, or a welding torch.

* * * * *